United States Patent
Hu et al.

(10) Patent No.: US 11,863,849 B2
(45) Date of Patent: Jan. 2, 2024

(54) OPTICAL ELEMENT DRIVING MECHANISM

(71) Applicant: TDK TAIWAN CORP., Taoyuan (TW)

(72) Inventors: Chao-Chang Hu, Taoyuan (TW); Shu-Shan Chen, Taoyuan (TW); Chen-Hsien Fan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 370 days.

(21) Appl. No.: 16/900,552

(22) Filed: Jun. 12, 2020

(65) Prior Publication Data

US 2020/0393635 A1 Dec. 17, 2020

Related U.S. Application Data

(60) Provisional application No. 62/861,440, filed on Jun. 14, 2019.

(51) Int. Cl.
| | |
|---|---|
| *H04N 23/51* | (2023.01) |
| *G02B 7/00* | (2021.01) |
| *G03B 5/04* | (2021.01) |
| *G02B 7/02* | (2021.01) |
| *G03B 5/02* | (2021.01) |

(Continued)

(52) U.S. Cl.
CPC ............ *H04N 23/51* (2023.01); *G02B 7/005* (2013.01); *G02B 7/026* (2013.01); *G02B 7/04* (2013.01); *G02B 7/08* (2013.01); *G02B 7/09* (2013.01); *G02B 26/02* (2013.01); *G02B 27/646* (2013.01); *G03B 3/10* (2013.01); *G03B 5/02* (2013.01); *G03B 5/04* (2013.01); *G03B 13/36* (2013.01); *H02K 11/21* (2016.01); *H02N 2/043* (2013.01); *H04N 23/55* (2023.01); *H04N 23/57* (2023.01); *H04N 23/60* (2023.01); *G03B 2205/0015* (2013.01); *G03B 2205/0053* (2013.01);

(Continued)

(58) Field of Classification Search
CPC ... H02N 2/02; H02N 2/043; G03B 2205/0061
See application file for complete search history.

(56) References Cited

U.S. PATENT DOCUMENTS

| | | | |
|---|---|---|---|
| 2004/0140737 A1* | 7/2004 | Barillot | H02N 2/028 310/328 |
| 2010/0038995 A1* | 2/2010 | Claeyssen | H02N 2/025 310/323.02 |

(Continued)

FOREIGN PATENT DOCUMENTS

CN 209657057 U 11/2019

OTHER PUBLICATIONS

Office Action issued in corresponding CN application No. 202021088926.8 dated Dec. 31, 2020 (2 pages).

*Primary Examiner* — Noam Reisner
(74) *Attorney, Agent, or Firm* — MUNCY, GEISSLER, OLDS & LOWE, P.C.

(57) ABSTRACT

An optical element driving mechanism is provided. The optical element driving mechanism includes a fixed portion, a movable portion, and a driving assembly. The fixed portion includes a main axis. The movable portion is movably disposed on the fixed portion. The movable portion is connected to an optical element. The driving assembly is used for driving the movable portion to move relative to the fixed portion.

18 Claims, 31 Drawing Sheets

(51) Int. Cl.
 *H02N 2/04* (2006.01)
 *H04N 23/55* (2023.01)
 *G02B 7/04* (2021.01)
 *G02B 27/64* (2006.01)
 *H02K 11/21* (2016.01)
 *G02B 7/09* (2021.01)
 *G02B 26/02* (2006.01)
 *G02B 7/08* (2021.01)
 *G03B 3/10* (2021.01)
 *G03B 13/36* (2021.01)
 *H04N 23/57* (2023.01)
 *H04N 23/60* (2023.01)

(52) U.S. Cl.
 CPC ............... *G03B 2205/0061* (2013.01); *G03B 2205/0069* (2013.01)

(56) References Cited

U.S. PATENT DOCUMENTS

2019/0103821 A1* 4/2019 Lim .................. H02N 2/02
2020/0393637 A1* 12/2020 Ryoo ................ H02N 2/142

* cited by examiner

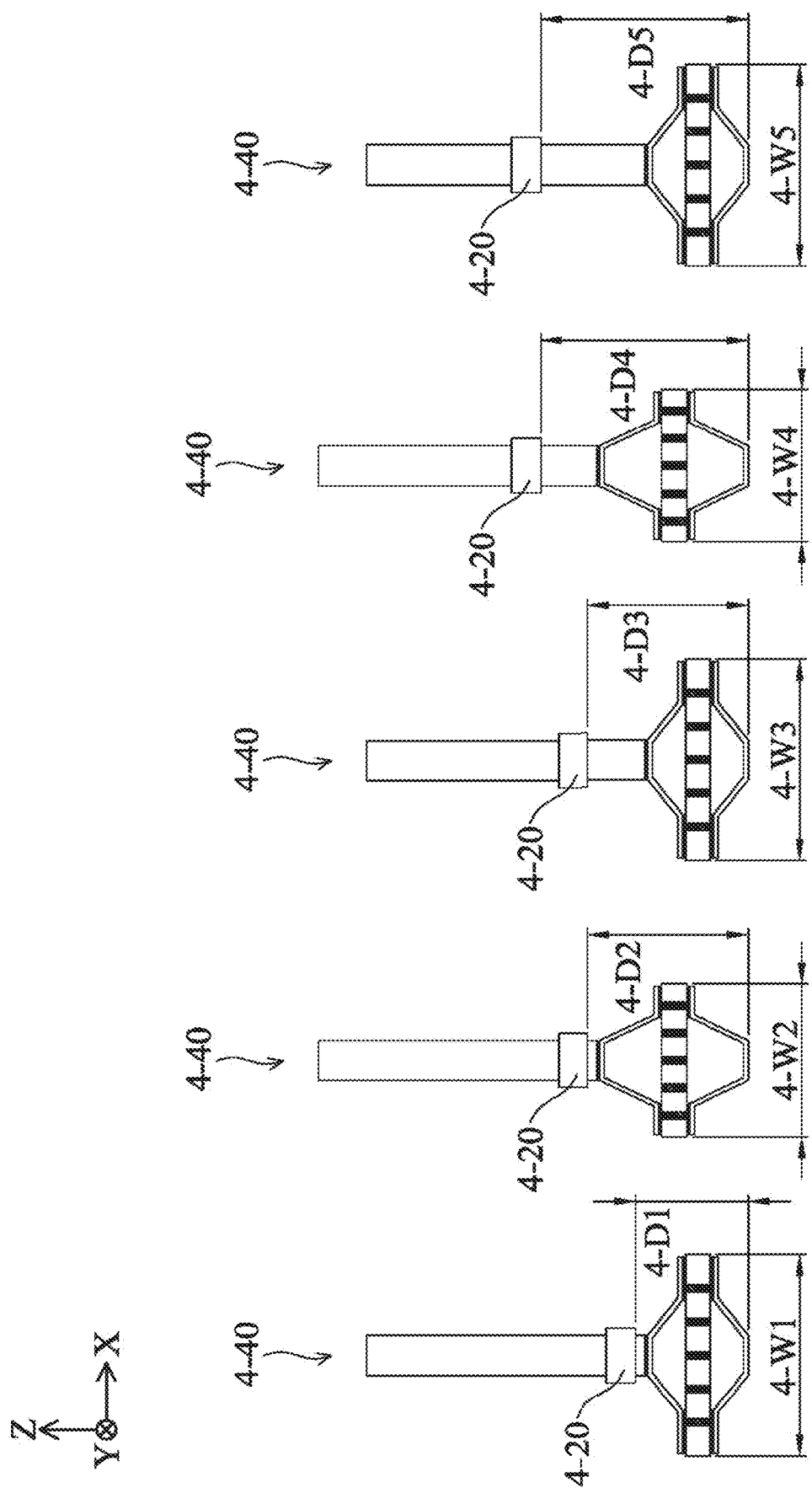

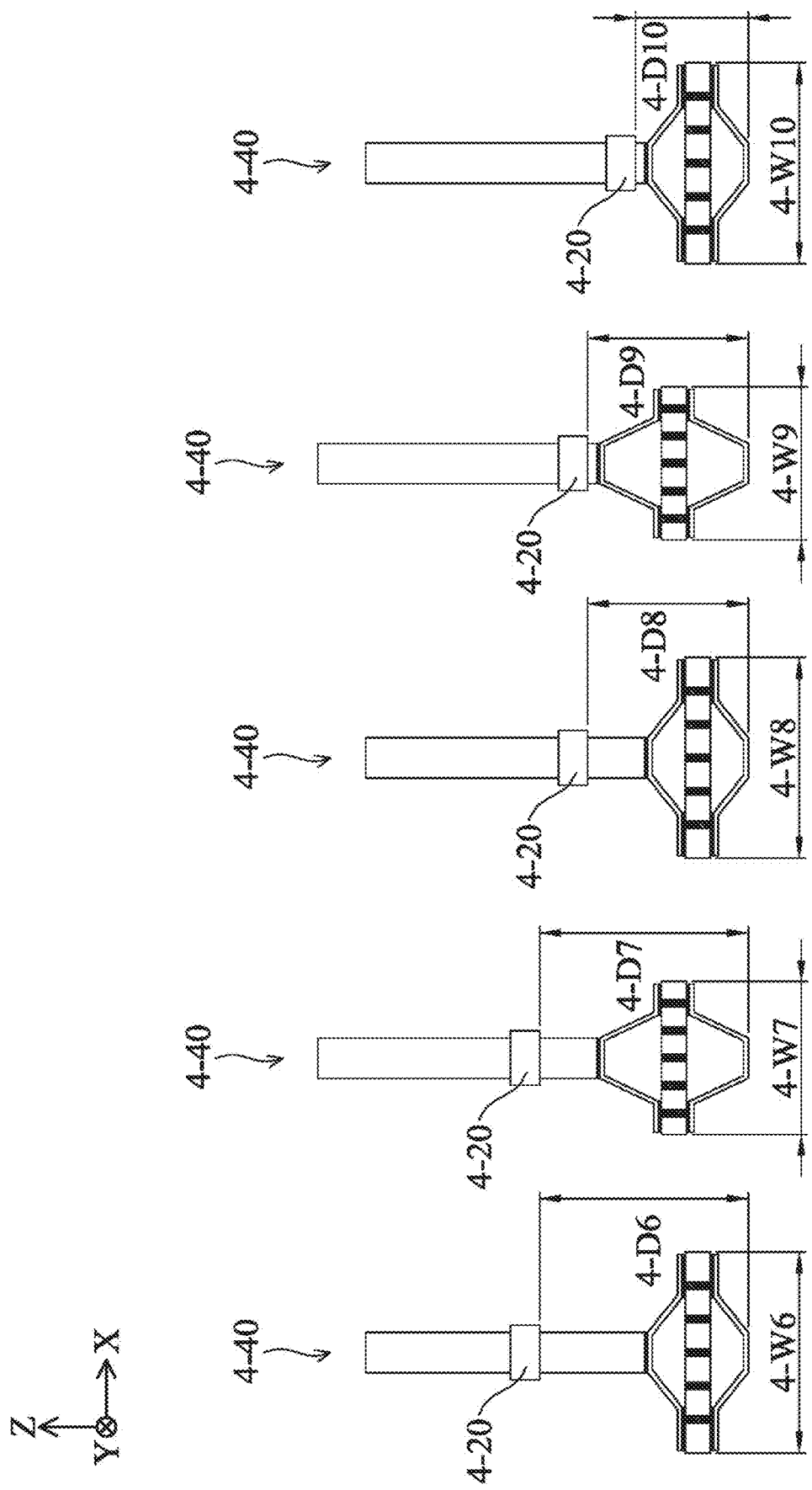

OPTICAL ELEMENT DRIVING MECHANISM

CROSS REFERENCE TO RELATED APPLICATIONS

The present application claims priority to U.S. Provisional Patent Application No. 62/861,440, filed on Jun. 14, 2019, which is incorporated by reference herein in their entirety.

BACKGROUND OF THE DISCLOSURE

Field of the Disclosure

The present disclosure relates to an optical element driving mechanism, and, in particular, to an optical element driving mechanism having piezoelectric driving assembly.

Description of the Related Art

As technology has developed, it has become more common to include image capturing or recording functions into many types of modern electronic devices, such as smartphones and digital cameras. These electronic devices are used more and more often, and new models have been developed that are convenient, thin, and lightweight, and offer more choices for consumers.

Electronic devices that have image capturing or recording functions normally include a driving mechanism to drive an optical element (e.g. a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF THE DISCLOSURE

An optical element driving mechanism is provided. The optical element driving mechanism includes a fixed portion, a movable portion, and a driving assembly. The fixed portion includes a main axis. The movable portion is movably disposed on the fixed portion. The movable portion is connected to an optical element. The driving assembly is used for driving the movable portion to move relative to the fixed portion.

In some embodiments, the driving assembly includes a transmission element, a first resilient element, and a driving element. The driving element is connected to the transmission element through the resilient element. The transmission element is driven by the driving element to move in a first direction.

In some embodiments, the driving element drives the transmission element to move in the first direction when the driving element is deformed in a second direction. The first direction and the second direction are not parallel.

In some embodiments, when the driving element is deformed in the second direction, the size of the first resilient element in the first direction is changed to move the transmission element in the first direction.

In some embodiments, the driving element includes two piezoelectric units arranged in the second direction.

In some embodiments, the driving element also includes an adhering element disposed between the piezoelectric units, which are electrically connected to each other in parallel or in series.

In some embodiments, the driving assembly also includes a second resilient element. The first resilient element and the second resilient element are disposed on different sides of the driving element. The second resilient element is connected to the fixed portion. When the driving element is deformed in the second direction, the size of the second resilient element in the first direction is changed in such a way that it moves the driving element and the transmission element in the first direction. The deformation amount of the first resilient element and the deformation amount of the second resilient element are substantially identical.

In some embodiments, the movable portion also includes a pressing element, a tightening element, and a contact unit. The pressing element presses the transmission in the pressing direction. The transmission element abuts the movable portion. The pressing direction is different than the first direction. The tightening element presses the pressing element. The pressing element at least partially overlaps the tightening element when viewed in a direction that is perpendicular to the first direction. The contact unit is disposed between the pressing element and the transmission element. The transmission element, the pressing element, and the contact unit at least partially overlap each other.

Some embodiments also include a rotational shaft disposed on the fixed portion, and the transmission element drives the movable portion to rotate relative to the rotational shaft.

In some embodiments, the movable portion includes a recess surrounding the rotational axis. The movable portion is positioned at the outer surface of the movable portion. The transmission element is disposed in the recess. The transmission element is exposed from the recess when viewed in a direction that is perpendicular to the main axis.

In some embodiments, the rotational shaft at least partially overlaps the movable portion when viewed in a direction that is perpendicular to the second direction. The rotational axis at least partially overlaps the transmission element when viewed in a third direction that is perpendicular to the first direction and the second direction.

In some embodiments, the optical element driving mechanism also includes first and second magnetic elements. The first magnetic element is disposed on the movable portion. The second magnetic element is disposed on the fixed portion. The first magnetic element, the second magnetic element, and the rotational shaft at least partially overlap each other when viewed in a direction that is perpendicular to the second direction. A force that is exerted toward the fixed portion is applied to the movable portion by the first magnetic element and the second magnetic element. The fixed portion includes a concave part. The movable portion includes a recessed structure. The first magnetic element is disposed in the concave part. The second magnetic element is disposed in the recessed structure.

In some embodiments, the optical element driving mechanism also includes a bonding element. The fixed portion includes a concave portion. The first resilient element is positioned between the fixed portion and the piezoelectric units. The bonding element is disposed in the concave portion. The first resilient element is connected to the fixed portion via the bonding element.

In some embodiments, the optical element driving mechanism also includes another driving assembly. The driving assemblies are connected to the fixed portion via the bonding element.

In some embodiments, the driving element is exposed from the first resilient element when viewed in the first direction.

In some embodiments, the movable portion includes a first movable portion and a second movable portion. The first movable portion is movably connected to the fixed portion. The second movable portion is movably connected to the first movable portion. The second movable portion is connected to the optical element.

In some embodiments, the driving assembly includes a transmission element, a first resilient element, and a driving element. The driving element drives the transmission element through the first resilient element to move in a first direction.

In some embodiments, the first movable portion moves in the first direction. The second movable portion moves in a second direction, which is different than the first direction. The transmission element is movably connected to the first movable portion.

In some embodiments, the optical element driving mechanism also includes an intermediate element and a bonding element. The intermediate element is positioned between the first movable portion and the second movable portion. The first movable portion includes a first sliding surface. The second movable portion includes a second sliding surface. The first sliding surface faces the second sliding surface. The first sliding surface and the second sliding surface are neither perpendicular nor parallel to the first direction or the second direction. The intermediate element is disposed between the first sliding surface and the second sliding surface. A first recess is positioned on the first sliding surface, which extends in the first direction when viewed in the second direction. The intermediate element is disposed in the first recess. The second recess is positioned on the second sliding surface, which extends in the first direction when viewed in the second direction. The intermediate element is disposed in the second recess. The driving assembly is connected to the fixed portion via the bonding element. The fixed portion also includes a base. The driving assembly is connected to the base via the bonding element. The base includes a first connecting surface, which is parallel to the second direction. The driving assembly includes a second connecting surface that is opposite the first connecting element. The bonding element is disposed between the first connecting surface and the second connecting surface. The first connecting surface at least partially overlaps the transmission element when viewed in the first direction.

In some embodiments, the optical element driving mechanism also includes a third resilient element movably connected to the second movable portion and the fixed portion, and the second movable portion is positioned between the third resilient element and the transmission element.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 3A to FIG. 3E are schematic views of a method in which the movable portion is driven by the driving assembly in Y direction.

FIG. 4A to FIG. 4E are schematic views of a method in which the movable portion is driven by the driving assembly in −Y direction.

DETAILED DESCRIPTION OF THE DISCLOSURE

Figure 1:
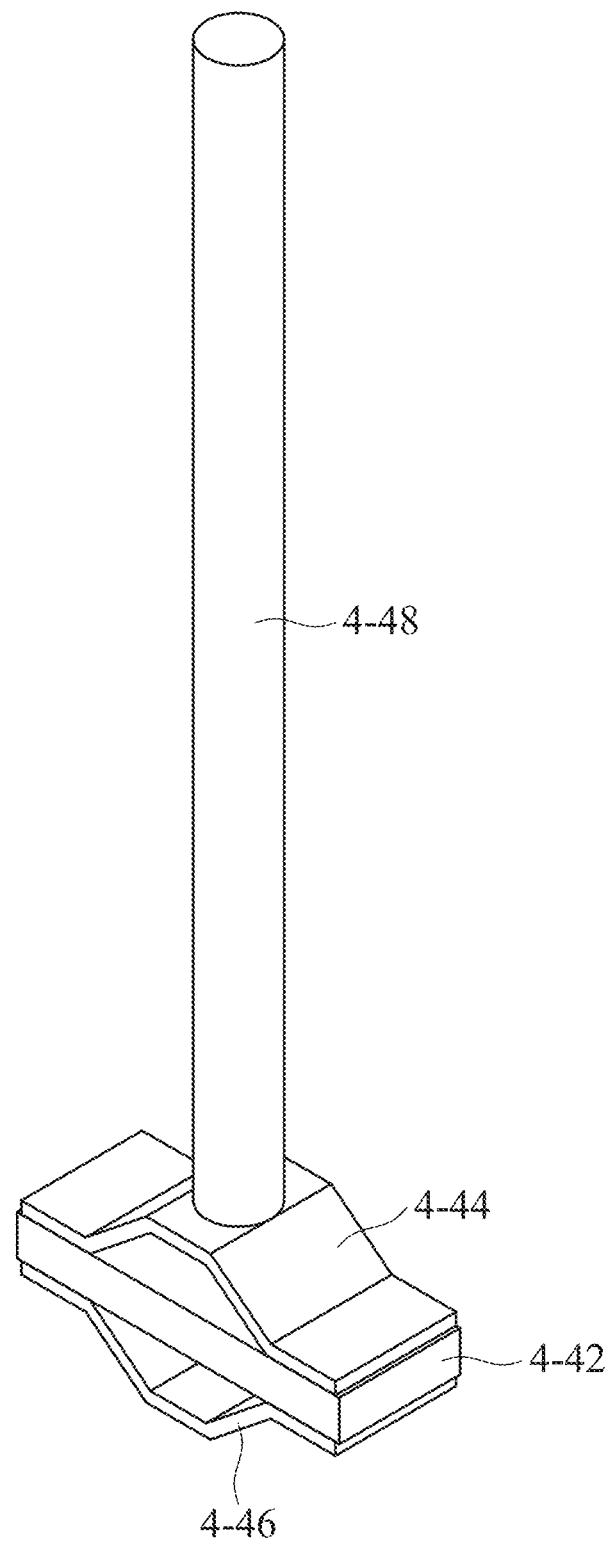
FIG. 1 and FIG. 2 are a perspective view and a side view of a driving assembly in some embodiments of the present disclosure, respectively.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

Figure 2:
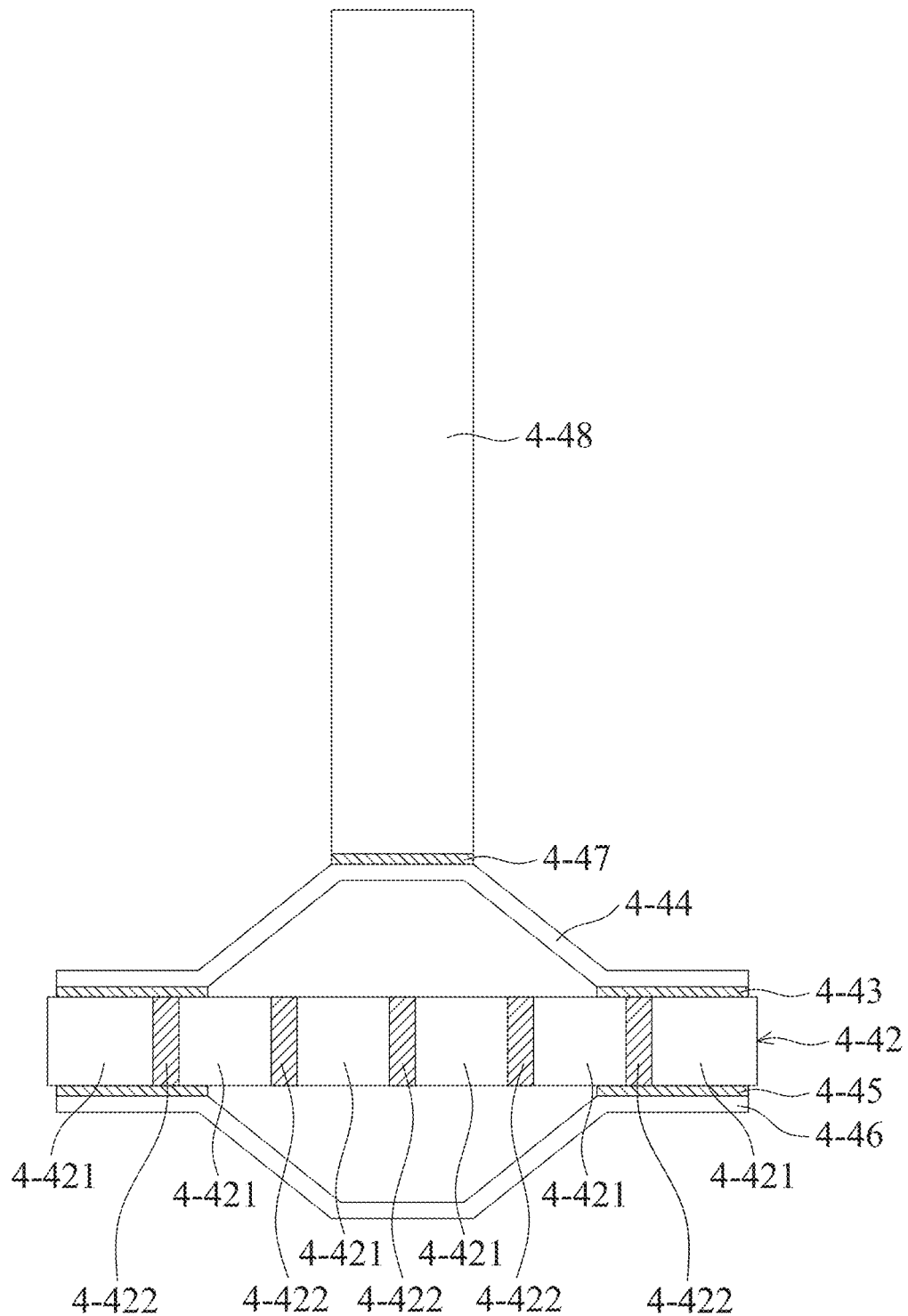

Refer to FIG. 1 and FIG. 2. FIG. 1 and FIG. 2 are a perspective view and a side view of a driving assembly 4-40 in some embodiments of the present disclosure, respectively. The driving assembly 4-40 mainly includes a driving element 4-42, a first resilient element 4-44, a second resilient element 4-46, and a transmission element 4-48. The driving element 4-42 is disposed between the first resilient element 4-44 and the second resilient element 4-46, and the transmission element 4-48 is connected to the driving element 4-42. In other words, both ends of the first resilient element 4-44 and the second resilient element 4-46 may be affixed to the driving element 4-42, and the middle of the first resilient element 4-44 and the second resilient element 4-46 are not directly connected to the driving element 4-42. In addition, the first resilient element 4-44 and the second resilient element 4-46 may be disposed on different sides of the driving element 4-42, respectively.

For example, a first bonding element 4-43 may be disposed between the driving element 4-42 and the first resilient element 4-44 to connect the driving element 4-42 and the first resilient element 4-44. In addition, a second connecting element 4-45 may be provided between the driving element 4-42 and the second resilient element 4-46 to connect the driving element 4-42 and the second resilient element 4-46. Furthermore, a third connecting element 4-47 may be provided between the driving element 4-42 and the transmission element 4-48 to connect the driving element 4-42 and the transmission element 4-48.

It should be noted that in the present disclosure, the extending direction of the transmission element 4-48 (or other transmission elements described below) is defined as the "first direction", and The deformation direction of the driving element 4-42 (or other driving elements described below) is defined as the "second direction".

In some embodiments, the first bonding element 4-43 and the second bonding element 4-45 may have similar materials, and the third bonding element 4-47 may have a different material. For example, the strain of the first bonding element 4-43 or the second bonding element 4-45 may be greater than the strain of the third bonding element 4-47. In other words, when subjected to stress, the deformation amount of the first bonding element 4-43 or the second bonding element 4-45 may be greater than the deformation amount of the third bonding element 4-47.

In some embodiments, the driving element 4-42 may include a plurality of piezoelectric units 4-421 (e.g., at least two piezoelectric units 4-421), and the piezoelectric units 4-421 may be connected by adhering elements 4-422. The piezoelectric units 4-421 may electrically connect to each other. For example, the piezoelectric units 4-421 may connect in series or in parallel to each other, depending on design requirements.

In some embodiments, the piezoelectric units 4-421 of the driving element 4-42 may form of piezoelectric materials. That is to say, when an electric field (voltage) is applied to the surface of the driving element 4-42, the electric dipole moment of the driving element 4-42 may be elongated, and the driving element 4-42 is resistant to changes and will extend along the electric field direction. Therefore, electrical energy may convert into mechanical energy. In some embodiments, an electric field in the X direction (second direction) may be applied to the driving element 4-42, so that the length of the driving element 4-42 in the X direction may be changed (e.g., elongated or shortened).

The first resilient element 4-44 and the second resilient element 4-46 may include a material that is deformable when subjected to force, so the first resilient element 4-44 and the second resilient element 4-46 may be deformed by the driving element 4-42 when the driving element 4-42 is deformed in the X direction. For example, the dimensions of the first resilient element 4-44 and the second resilient element 4-46 in the X direction and the Y direction may be changed. In some embodiments, the deformation amounts of the first resilient element 4-44 and the second resilient element 4-46 in the X direction are substantially the same.

In some embodiments, the materials of the first resilient element 4-44 and the second resilient element 4-46 may include metal materials, but they are not limited thereto. In addition, the transmission element 4-48 may include a material with a smooth surface, such as carbon (e.g., graphite), but it is not limited thereto.

In some embodiments, as shown in FIG. 2, the length of the driving element 4-42 in the X direction may be greater than the length of the first resilient element 4-44 or the second resilient element 4-46 in the X direction. As a result, the first resilient element 4-44 and the second resilient element 4-46 may have sufficient contact area with the driving element 4-42 to improve their bonding strength.

Figure 3F:
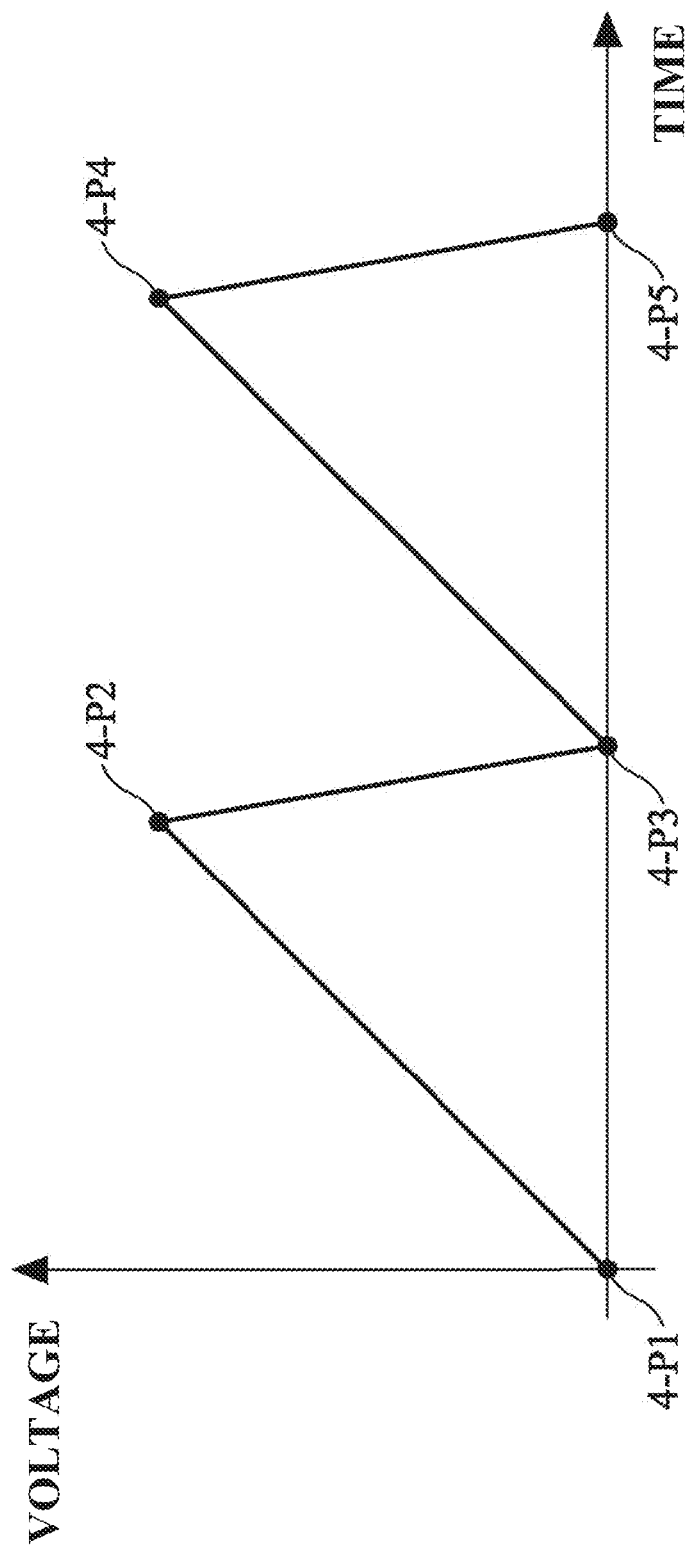
FIG. 3F is a schematic view of the relationship between the voltage applied to the driving assembly and time in this method.

FIG. 3A to FIG. 3E are schematic views of a method in which the movable portion 4-20 is driven by the driving assembly 4-40 in Y direction (first direction), and FIG. 3F is a schematic view of the relationship between the voltage applied to the driving assembly 4-40 and time in this method. As shown in FIG. 3A, the movable portion 4-20 is movably disposed on the transmission element 4-48 of the driving assembly 4-40. It may be disposed on the transmission element 4-48 by frictional contact, for example. If the force applied on the transmission element 4-48 is greater than the maximum static friction between the movable portion 4-20 and the transmission element 4-48, the movable portion 4-20 may be moved relative to the transmission element 4-48 in the extending direction of the transmission element 4-48 (the first direction, such as the Y direction in FIG. 3A to FIG. 3E).

The state of FIG. 3A corresponds to the point 4-P1 in FIG. 3F, in which no voltage is applied to the driving assembly 4-40. The movable portion 4-20 is at a starting position at this time, the distance between the movable portion 4-20 and the bottom of the second resilient element 4-46 is 4-D1, and the length of the driving element 4-42 in the X direction at this time is 4-W1.

Next, as shown in FIG. 3B, a voltage is applied to the driving assembly 4-40 to shorten the length of the driving element 4-42 in the X direction to the length 4-W2. In other words, the length 4-W1 is greater than the length 4-W2. At this time, since both ends of the first resilient element 4-44 and the second resilient element 4-46 are affixed to the driving element 4-42, the first resilient element 4-44 and the second resilient element 4-46 may also be moved by the driving element 4-42, which is deformed in the X direction (second direction). As a result, the size of the first resilient element 4-44 and the second resilient element 4-46 in the X direction may be reduced as well, thereby increasing the sizes of the first resilient element 4-44 and the second resilient element 4-46 in the Y direction. Therefore, the transmission element 4-48 disposed on the first resilient element 4-44 may be also driven together and move in the Y direction.

Since the movable portion 4-20 is disposed on the transmission element 4-48 by frictional contact, a voltage with a slower increasing speed may be applied to the driving assembly 4-40 to make the force received by the movable portion 4-20 less than the maximum static friction between the movable portion 4-20 and the transmission element 4-48, to allow the movable portion 4-20 and the transmission element 4-48 to move together in the Y direction. At this time, the distance between the movable portion 4-20 and the bottom of the second resilient element 4-46 is 4-D2, and the distance 4-D2 is greater than the distance 4-D1. The state at this time corresponds to the point 4-P2 in FIG. 3F.

Next, as shown in FIG. 3C, another voltage is applied to the driving assembly 4-40 to increase the length of the driving element 4-42 in the X direction to the length 4-W3, and the corresponding state at this time is the point 4-P3 in FIG. 3F. It should be noted that the changing direction of the applied voltage at this time is opposite the changing direction of the applied voltage in the state of FIG. 3B, and the absolute value of the applied current in FIG. 3C (the differential of voltage with respect to time at this time, which is the slope between the point 4-P2 and the point 4-P3 in FIG. 3F) is greater than the absolute value of the applied current in FIG. 3B (the slope between the point 4-P1 and the point 4-P2 in FIG. 3F). In other words, the absolute value of the rate of change of the length of the driving element 4-42 at this time is greater than that in FIG. 3B, that is, the force received by the movable portion 4-20 will be greater than that in the state of FIG. 3B.

By designing the force applied on the movable portion 4-20 in the state of FIG. 3C to be greater than the maximum static friction force between the movable portion 4-20 and the transmission element 4-48, the movable portion 4-20 may be allowed to move relative to the transmission elements 4-48. For example, at this time, the distance between the movable portion 4-20 and the bottom of the second resilient element 4-46 is 4-D3, and the distance 4-D3 is greater than the distance 4-D1 in FIG. 3A, and is substantially equal to the distance 4-D2 in FIG. 3B. Thereby, the movable portion 4-20 may move in the Y direction (first direction).

FIG. 3D and FIG. 3E are similar to the states of FIG. 3B and FIG. 3C, wherein another voltage is applied to the driving assembly 4-40 in the state of FIG. 3D, so that the length of the driving element 4-42 in the X direction is reduced to the length 4-W4. In the state of FIG. 3E, another voltage is applied to the driving assembly 4-40 to increase the length of the driving element 4-42 in the X direction to the length 4-W5, wherein the length 4-W4 is less than the length 4-W3, and the length 4-W5 is greater than the length 4-W4. The state of FIG. 3D corresponds to the point 4-P4 in FIG. 3F, and the state of FIG. 3E corresponds to the point 4-P5 in FIG. 3F. The absolute value of the applied current in FIG. 3D is less than the absolute value of the applied current in FIG. 3E, that is, the absolute value of the slope between points 4-P3 and 4-P4 is less than the absolute value of the slope between points 4-P4 and 4-P5. In this way, the distance between the movable portion 4-20 and the bottom of the second resilient element 4-46 may be changed to the distance 4-D4 (FIG. 3D) and the distance 4-D5 (FIG. 3E) in a similar manner as shown in FIG. 3B and FIG. 3C. The distance 4-D4 is greater than the distance 4-D3 in FIG. 3C, and the distance 4-D5 is substantially equal to the distance 4-D4. As a result, the movable portion 4-20 may further move in the Y direction.

Figure 4F:
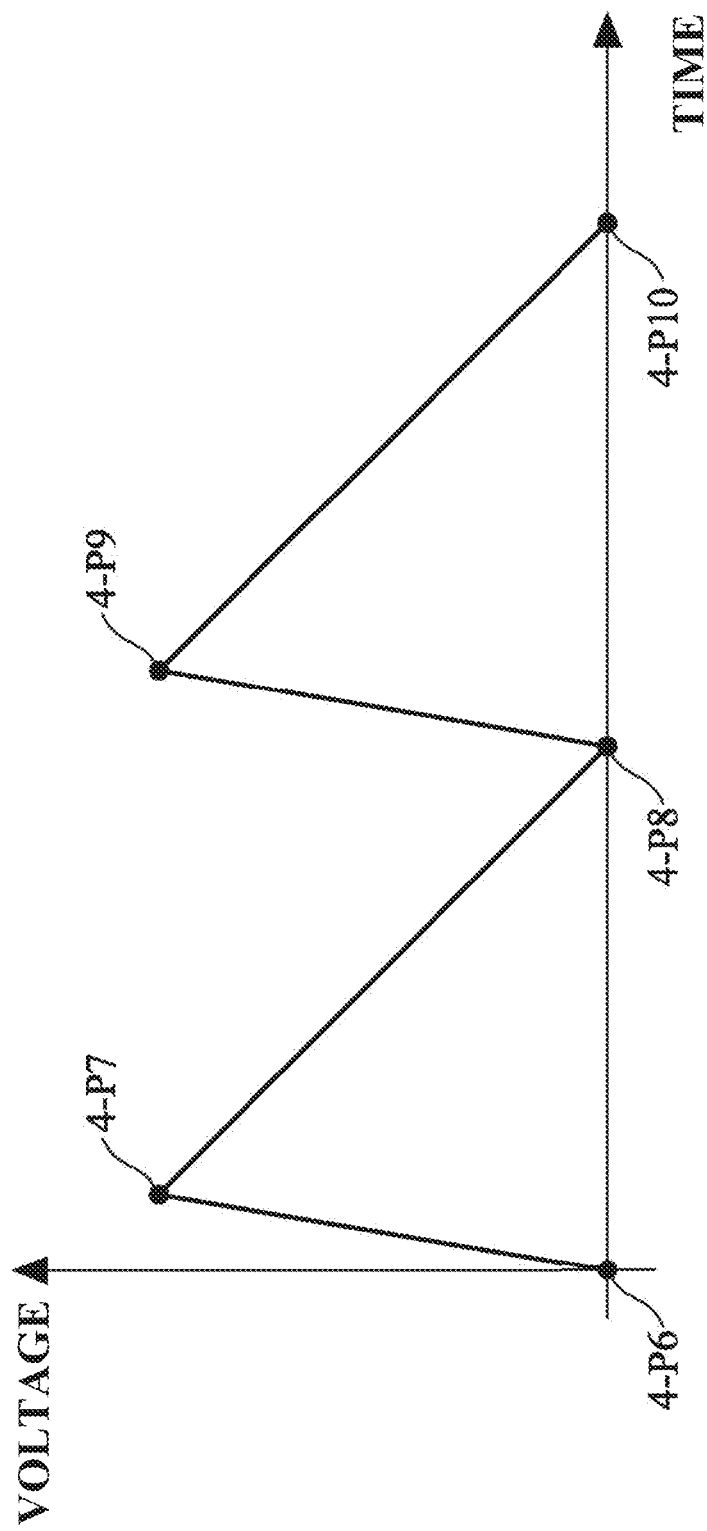
FIG. 4F is a schematic view of the relationship between the voltage applied to the driving assembly and time in this method.

FIG. 4A to FIG. 4E are schematic views of a method in which the movable portion 4-20 is driven by the driving assembly 4-40 in the −Y direction, and FIG. 4F is a schematic view of the relationship between the voltage applied to the driving assembly 4-40 and time in this method. As shown in FIG. 4A, the movable portion 4-20 is movably disposed on the transmission element 4-48 of the driving assembly 4-40. It may be disposed on the transmission element 4-48 by frictional contact, for example. If the force applied on the transmission element 4-48 is greater than the maximum static friction between the movable portion 4-20 and the transmission element 4-48, the movable portion 4-20 may be moved relative to the transmission element 4-48 in the extending direction of the transmission element 4-48 (the first direction, such as the −Y direction in FIG. 4A to FIG. 4E).

The state of FIG. 4A corresponds to the point 4-P6 in FIG. 4F, in which no voltage is applied to the driving assembly 4-40. The movable portion 4-20 is at a starting position at this time, the distance between the movable portion 4-20 and the bottom of the second resilient element 4-46 is 4-D6, and the length of the driving element 4-42 in the X direction at this time is 4-W6.

Next, as shown in FIG. 4B, a voltage is applied to the driving assembly 4-40 to shorten the length of the driving element 4-42 in the X direction to the length 4-W7. In other words, the length 4-W6 is greater than the length 4-W7. At this time, since both ends of the first resilient element 4-44 and the second resilient element 4-46 are affixed to the driving element 4-42, the first resilient element 4-44 and the second resilient element 4-46 may also be moved by the driving element 4-42, which is deformed in the X direction (second direction). As a result, the size of the first resilient element 4-44 and the second resilient element 4-46 in the X direction may be reduced as well, thereby increasing the sizes of the first resilient element 4-44 and the second resilient element 4-46 in the Y direction. Therefore, the transmission element 4-48 disposed on the first resilient element 4-44 may be also driven together and move in the Y direction (first direction).

Since the movable portion 4-20 is disposed on the transmission element 4-48 by frictional contact, a more severe voltage may be applied to the driving assembly 4-40 to make the force received by the movable portion 4-20 greater than the maximum static friction between the movable portion 4-20 and the transmission element 4-48, to allow the movable portion 4-20 move relative to the transmission element 4-48 in the Y direction. At this time, the distance between the movable portion 4-20 and the bottom of the second resilient element 4-46 is 4-D7, and the distance 4-D7 is substantially equal to the distance 4-D6. The state at this time corresponds to the point 4-P7 in FIG. 4F.

Next, as shown in FIG. 4C, another voltage is applied to the driving assembly 4-40 to increase the length of the driving element 4-42 in the X direction to the length 4-W8, and the corresponding state at this time is the point 4-P8 in FIG. 4F. It should be noted that the changing direction of the applied voltage at this time is opposite the changing direction of the applied voltage in the state of FIG. 4B, and the absolute value of the applied current in FIG. 4C (the differential of voltage with respect to time at this time, which is the slope between the point 4-P7 and the point 4-P8 in FIG. 4F) is less than the absolute value of the applied current in FIG. 4B (the slope between the point 4-P6 and the point 4-P7 in FIG. 4F). In other words, the absolute value of the rate of change of the length of the driving element 4-42 at this time is less than that in FIG. 4B, that is, the force received by the movable portion 4-20 will be less than that in the state of FIG. 4B.

By designing the force applied on the movable portion 4-20 in the state of FIG. 4C to be less than the maximum static friction force between the movable portion 4-20 and the transmission element 4-48, the movable portion 4-20 may be allowed to move together with the transmission elements 4-48. For example, at this time, the distance between the movable portion 4-20 and the bottom of the second resilient element 4-46 is 4-D8, and the distance 4-D8 is less than the distance 4-D6 in FIG. 4A and the distance 4-D7 in FIG. 4B. Thereby, the movable portion 4-20 may move in the −Y direction (first direction).

FIG. 4D and FIG. 4E are similar to the states of FIG. 4B and FIG. 4C, wherein another voltage is applied to the driving assembly 4-40 in the state of FIG. 4D, so that the length of the driving element 4-42 in the X direction is reduced to the length 4-W9. In the state of FIG. 4E, another voltage is applied to the driving assembly 4-40 to increase the length of the driving element 4-42 in the X direction to the length 4-W10, wherein the length 4-W9 is less than the length 4-W8, and the length 4-W10 is greater than the length 4-W9. The state of FIG. 4D corresponds to the point 4-P9 in FIG. 4F, and the state of FIG. 4E corresponds to the point 4-P10 in FIG. 4F. The absolute value of the applied current in FIG. 4D is greater than the absolute value of the applied current in FIG. 4E, that is, the absolute value of the slope between points 4-P8 and 4-P9 is greater than the absolute value of the slope between points 4-P9 and 4-P10. In this way, the distance between the movable portion 4-20 and the bottom of the second resilient element 4-46 may be changed to the distance 4-D9 (FIG. 4D) and the distance 4-D10 (FIG. 4E) in a similar manner as shown in FIG. 4B and FIG. 4C. The distance 4-D9 is substantially equal to the distance 4-D8 in FIG. 4C, and the distance 4-D10 is less than the distance 4-D9. As a result, the movable portion 4-20 may further move in the −Y direction.

The absolute value of the slope between the point 4-P1 and the point 4-P2, the absolute value of the slope between the point 4-P3 and the point 4-P4, the absolute value of the slope between the point 4-P6 and the point 4-P7, and the absolute value of the slope between the point 4-P8 and the point 4-P9 may be substantially identical. The absolute value of the slope between the point 4-P2 and the point 4-P3, the absolute value of the slope between the point 4-P4 and the point 4-P5, the absolute value of the slope between the point 4-P7 and the point 4-P8, and the absolute value of the slope between the point 4-P9 and the point 4-P10 may also be substantially identical. Therefore, the design of the optical element driving mechanism 4-100 may be simplified.

In some embodiments, the voltage on the Y axis in FIG. 3F or FIG. 4F may also be changed to current, that is, the drive components 4-40 also may be operated in the foregoing manner by changing the current, depending on design requirements.

By repeating the states of FIG. 3A to FIG. 3E or the states of FIG. 4A to FIG. 4E, the movable portion 4-20 may be moved to a specific position, thereby controlling the position of the movable portion 4-20 in the Y direction. In some embodiments, the position of the movable portion 4-20 in the Y direction may be sensed by a sensing element (not shown), and the driving assembly 4-40 may be controlled by the sensed position signal to stop driving the driving assembly 4-40 when the movable portion 4-20 reaching the desired position. The aforementioned sensing element may include a Hall sensor, a Magnetoresistance Effect Sensor (MR Sensor), a Giant Magnetoresistance Effect Sensor (GMR Sensor), a Tunneling Magnetoresistance Effect Sensor (TMR Sensor), or a Fluxgate sensor.

Figure 5:
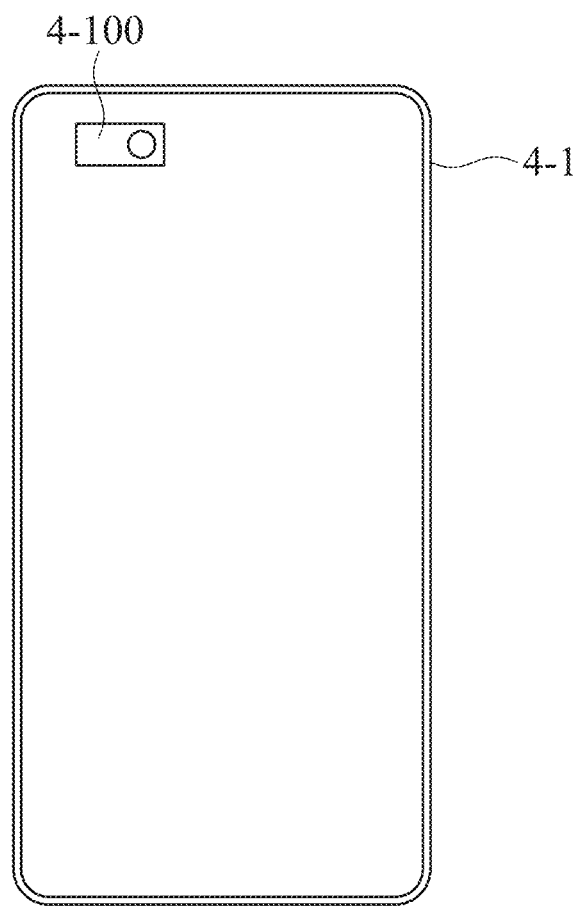
FIG. 5 is a schematic view of an electronic device in some embodiments of the present disclosure.

FIG. 5 is a schematic view of an electronic device 4-1 according to some embodiments of the present disclosure. The electronic device 4-1 may be, for example, a mobile electronic device (e.g. mobile phone, tablet, notebook computer, etc.), and the electronic device 4-1 may have an optical element driving mechanism 4-100 to allow the electronic device 4-1 taking a photo.

Figure 6A:
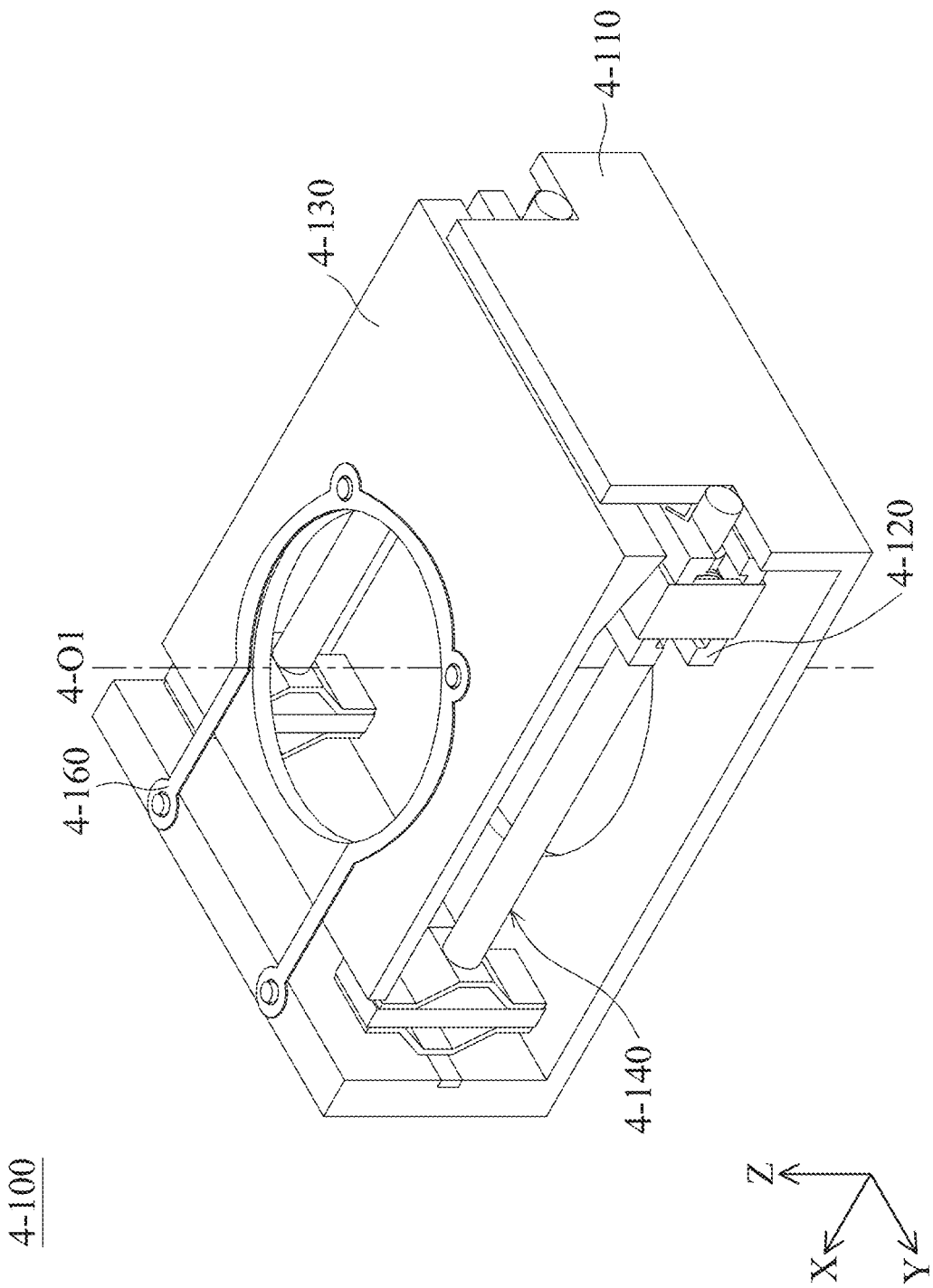
FIG. 6A is a schematic view of an optical element driving mechanism in some embodiments of the present disclosure.
Figure 6B:
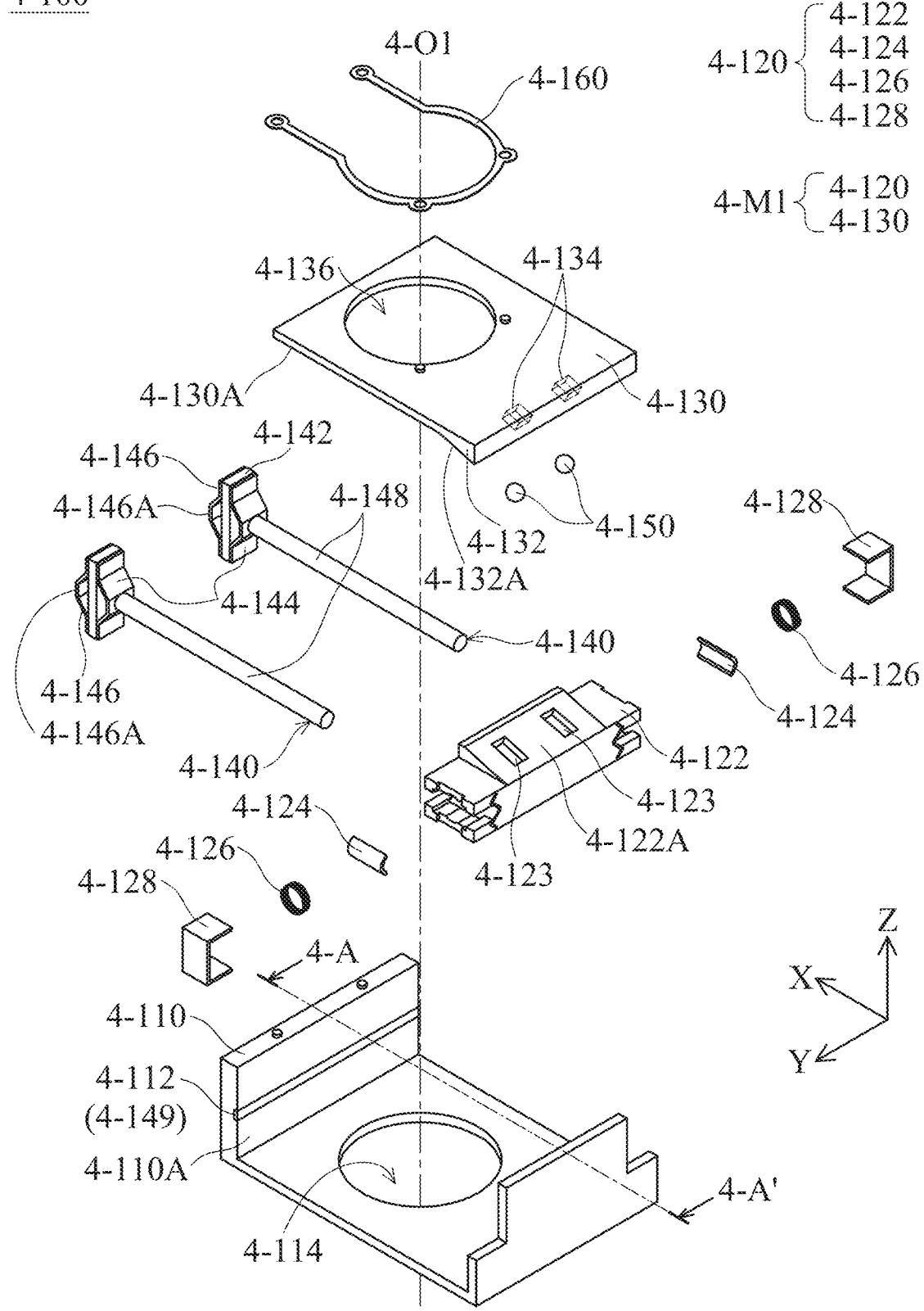
FIG. 6B is an exploded view of the optical element driving mechanism.
Figure 7A:
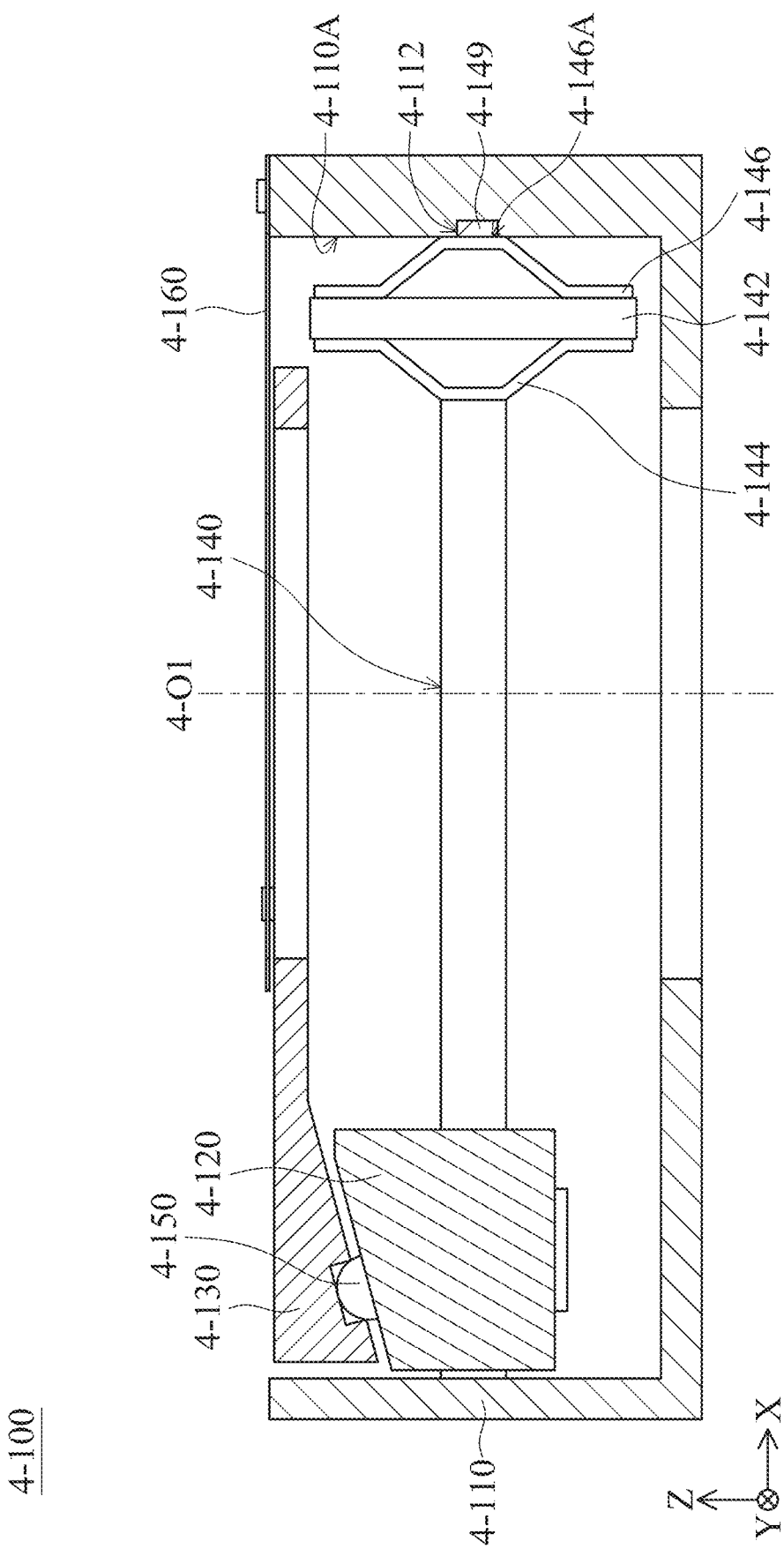
FIG. 7A is a schematic view of the optical element driving mechanism when viewed in the Y direction in FIG. 6A.
Figure 7B:
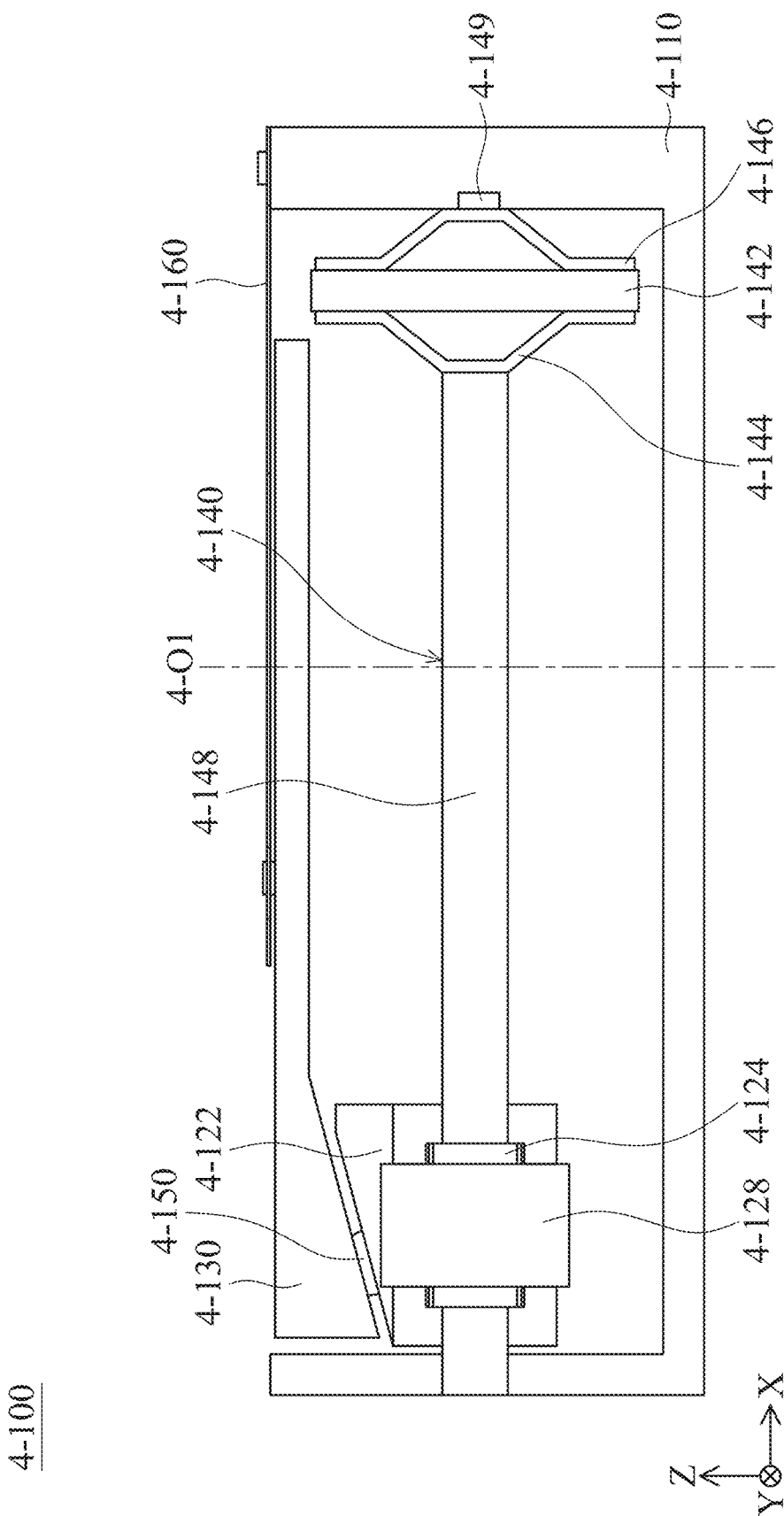
FIG. 7B is a cross-sectional view of the optical element driving mechanism illustrated along the line 4-A-4-A' in FIG. 6A.

FIG. 6A is a schematic view of an optical element driving mechanism 4-100 of some embodiments of the present disclosure. FIG. 6B is an exploded view of the optical element driving mechanism 4-100. FIG. 7A is a schematic view of the optical element driving mechanism 4-100 viewed in the Y direction of FIG. 6A. FIG. 7B is a cross-sectional view of the optical element driving mechanism 4-100 illustrated along a line 4-A-4-A' in FIG. 6A. As shown in FIG. 6A to FIG. 7B, the optical element driving mechanism 4-100 may mainly include a base 4-110 (or fixed portion 4-110) and a movable portion 4-M1 (which includes a first movable portion 4-120 and a second movable portion 4-130), two driving assemblies 4-140, two intermediate elements 4-150, and a third resilient element 4-160 arranged on a main axis 4-01. It should be noted that the coordinate axis of the following embodiments is different from the previous embodiments.

In some embodiments, the driving assembly 4-140 may include a driving element 4-142, a first resilient element 4-144, a second resilient element 4-146, and a transmission element 4-148, and the materials and functions of which are similar to that of the driving element 4-42, the first resilient element 4-44, the second resilient element 4-46, and the transmission element 4-48 of the driving assembly 4-40, which will not be repeated here. In addition, the first bonding element 4-43, the second bonding element 4-45, and the third bonding element 4-47 in FIG. 6A to FIG. 7B are omitted in the driving assembly 4-140 for brevity. It should be understood that the driving assembly 4-140 may also have similar elements.

The base 4-110 may have a first connecting surface 4-110A, and the second resilient element 4-146 of the driving assembly 4-140 may have a second connecting surface 4-146A. The first connecting surface 4-110A is opposite the second connecting surface 4-146A, that is, the first connecting surface 4-110A faces the second connecting surface 4-146A. A bonding element 4-149 may be provided between the first connecting surface 4-110A and the second connecting surface 4-146A, such as in a recess 4-112 on the first connecting surface 4-110, so that the driving assembly 4-140 may be affixed to the base 4-110. It should be noted that the first connecting surface 4-110A and the second connecting surface 4-146A are parallel to the deformation direction of the driving element 4-142 (the second direction, such as the Z direction in FIG. 6A to FIG. 7B). In addition, the base 4-110 may also have an opening 4-114, which allows light to pass through the opening 4-114 and reach a light sensing element (not shown) to receive the image signal passing through the opening 4-114.

Figure 7C:
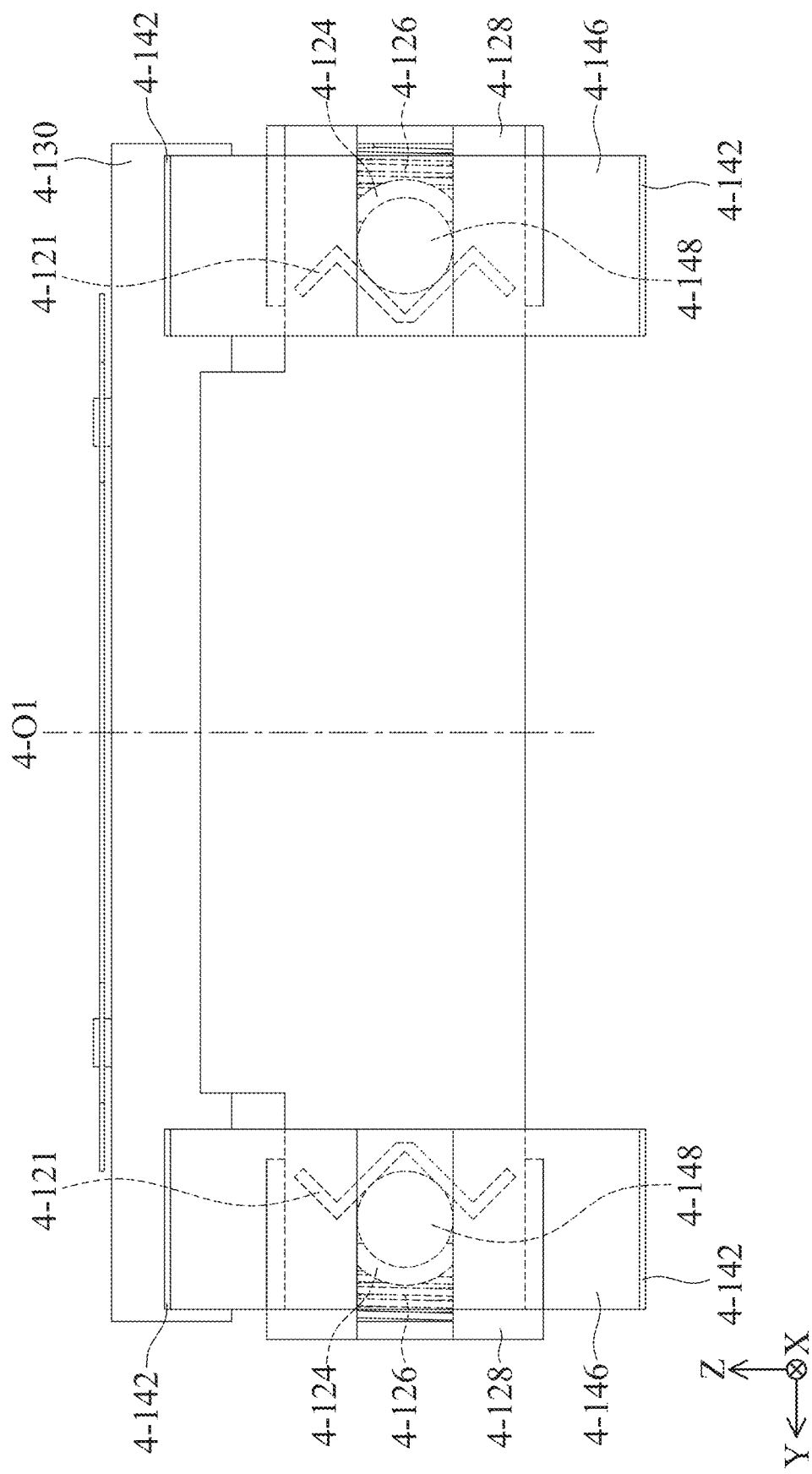
FIG. 7C is a schematic view of the optical element driving mechanism when viewed in the X direction.
Figure 8A:
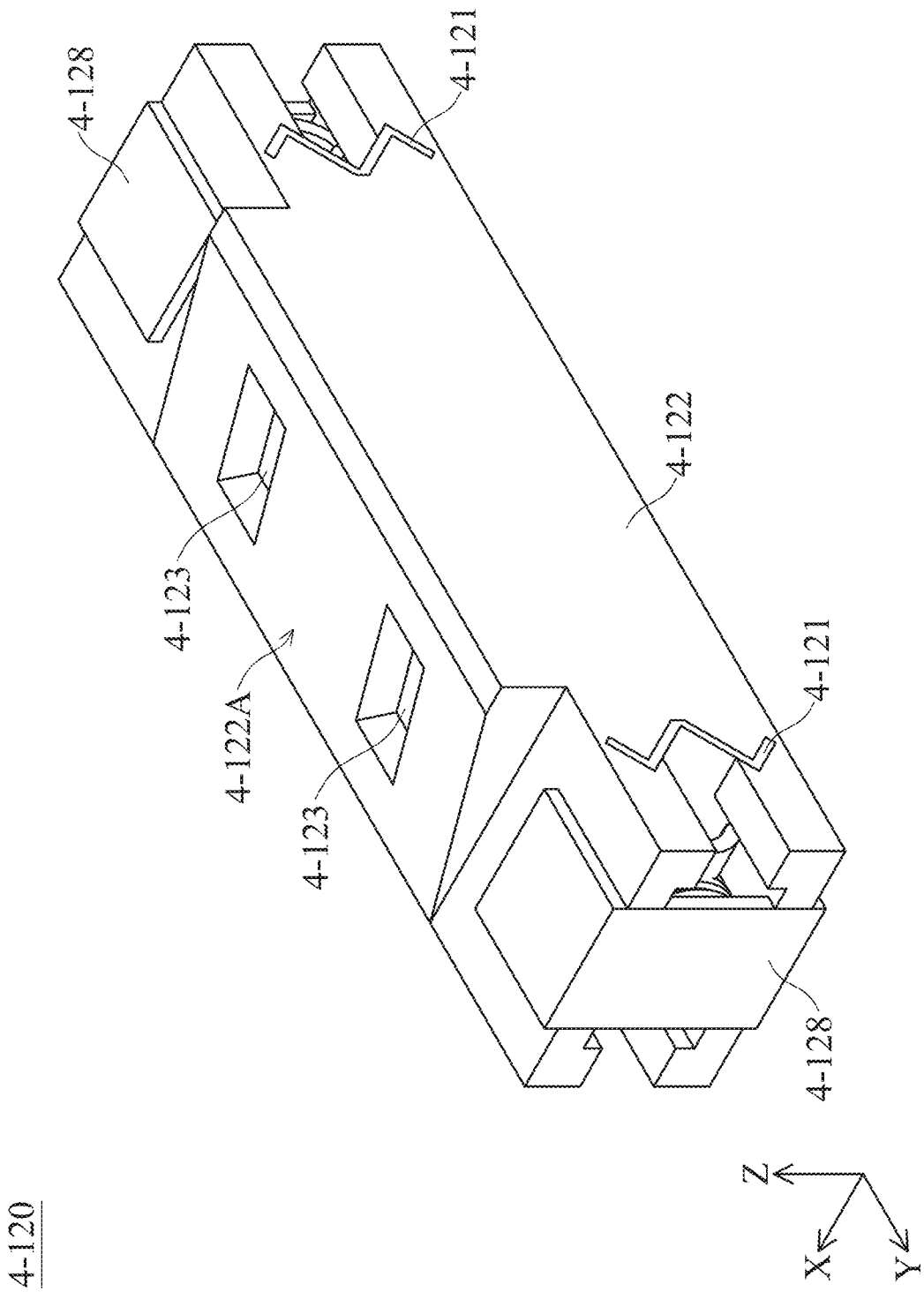
FIG. 8A is a perspective view of the first movable portion.
Figure 8C:
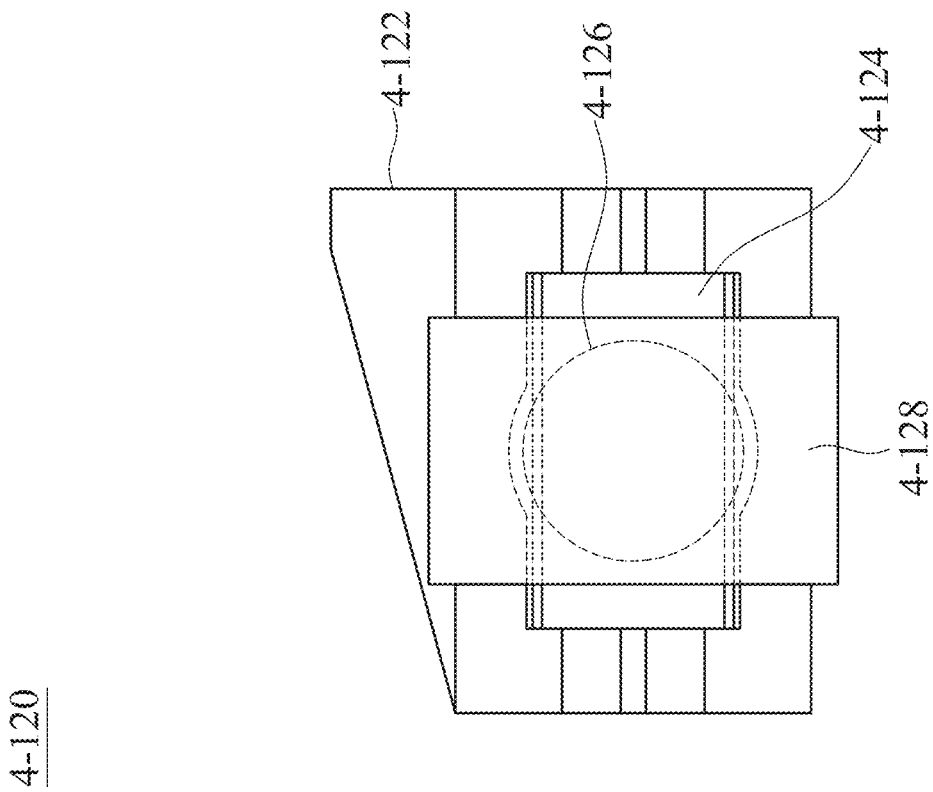
FIG. 8C is a side view of the first movable portion.
Figure 8B:
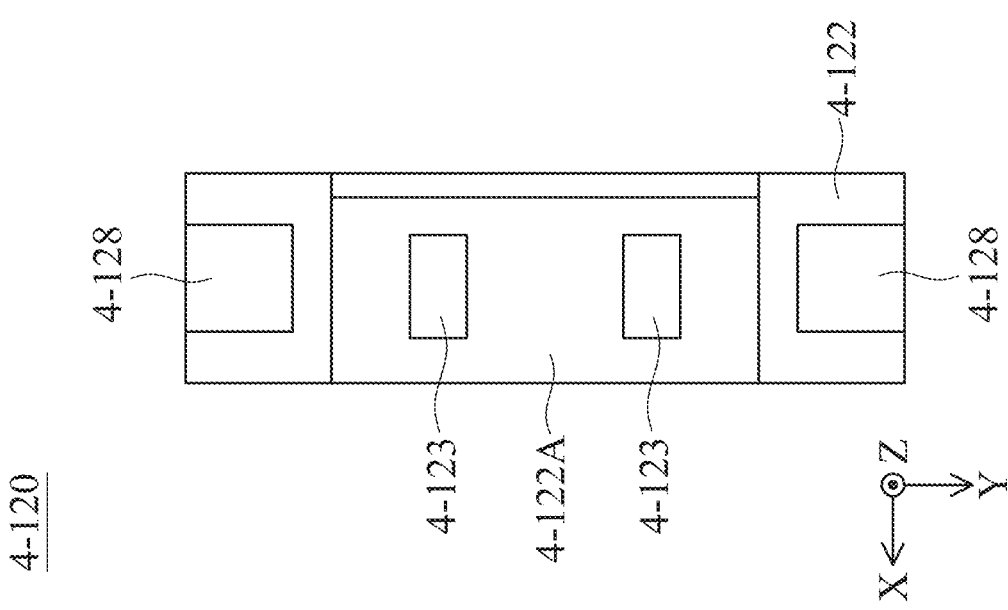
FIG. 8B is a top view of the first movable portion.

FIG. 7C is a schematic view of the optical element driving mechanism 4-100 when viewed from the X direction, in which the base 4-110 is omitted for simplicity. FIG. 8A is a perspective view of the first movable portion 4-120, FIG. 8B is a top view of the first movable portion 4-120, and FIG. 8C is a side view of the first movable portion 4-120. The first movable portion 4-120 of the movable portion 4-M1 may include a body 4-122, a contact unit 4-124, a pressing element 4-126, and a tightening element 4-128. The transmission element 4-148 may be disposed between the body 4-122 and the contact unit 4-124, and the pressing element 4-126 may be disposed between the contact unit 4-124 and the tightening element 4-128. The tightening element 4-128 may be disposed on the body 4-122. In addition, another contact unit 4-121 may be embedded in the body 4-122.

In some embodiments, the body 4-122 of the first movable portion 4-120 may have a first sliding surface 4-122A, and the first sliding surface 4-122A may have a first recess 4-123. The first sliding surface 4-122A may be parallel to the third direction (Y direction), and neither parallel nor perpendicular to the first direction (Z direction) and the second direction (X direction).

In some embodiments, the pressing element 4-126 may be, for example, a spring, and may press the transmission element 4-148 in a pressing direction (e.g., Y direction) through the contact unit 4-124. Therefore, the transmission element 4-148 abuts the contact unit 4-121 disposed on the body 4-122 of the first movable portion 4-120, wherein the pressing direction (for example, Y direction) is different from the first direction (for example, Z direction). In addition, the tightening element 4-128 may also be used to apply pressure to the pressing element 4-126 in the pressing direction. As shown in FIG. 7B, when viewed in the Y direction that is perpendicular to the first direction (e.g., the Z direction), the pressing element 4-126 at least partially overlaps the tightening element 4-128. In addition, in the Y direction, the transmission element 4-148, the pressing element 4-126, and the contact unit 4-124 at least partially overlap with each other. Thereby, the size of the movable portion 4-120 in a specific direction may be reduced to achieve miniaturization.

By providing the contact unit 4-124, the pressing element 4-126, and the tightening element 4-128 on the first movable portion 4-120, the transmission element 4-148 may be forced to abut the main body 4-122 of the first movable portion 4-120, and the transmission element 4-148 may be disposed on the first movable portion 4-120 in frictional contact. After that, the first movable portion 4-120 may be moved along the extending direction (first direction/Z direction) of the transmission element 4-148 by the principle of the foregoing embodiments.

In some embodiments, a third resilient element 4-160 may be disposed on the second movable portion 4-130 to limit the movable range of the second movable portion 4-130. The third resilient element 4-160 may be, for example, a spring sheet, and may movably connect the fixed portion 4-110 and the second movable portion 4-130. The second movable portion 4-130 is positioned between the third resilient element 4-160 and the transmission element 4-148.

Figure 9B:
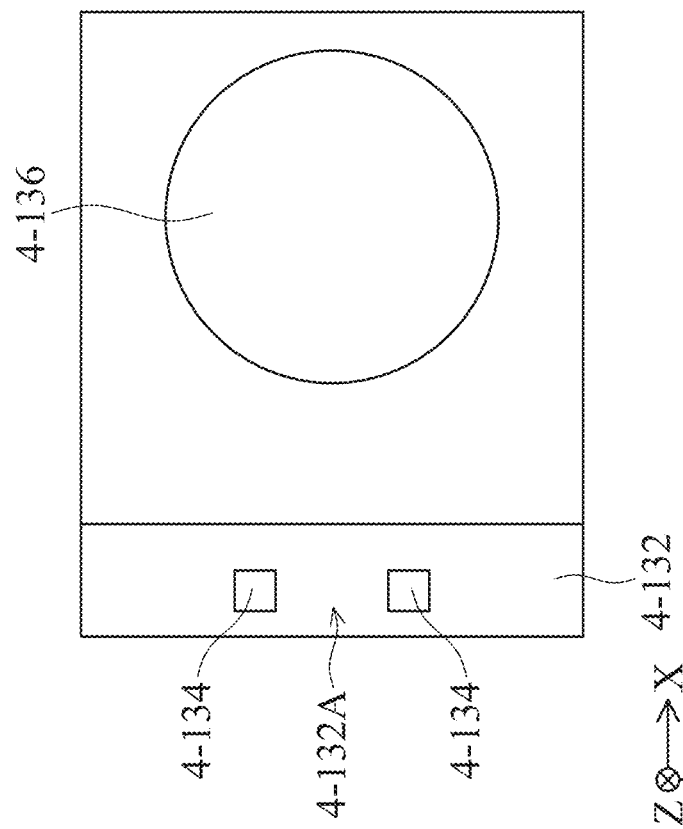
FIG. 9B is a bottom view of the second movable portion.
Figure 9A:
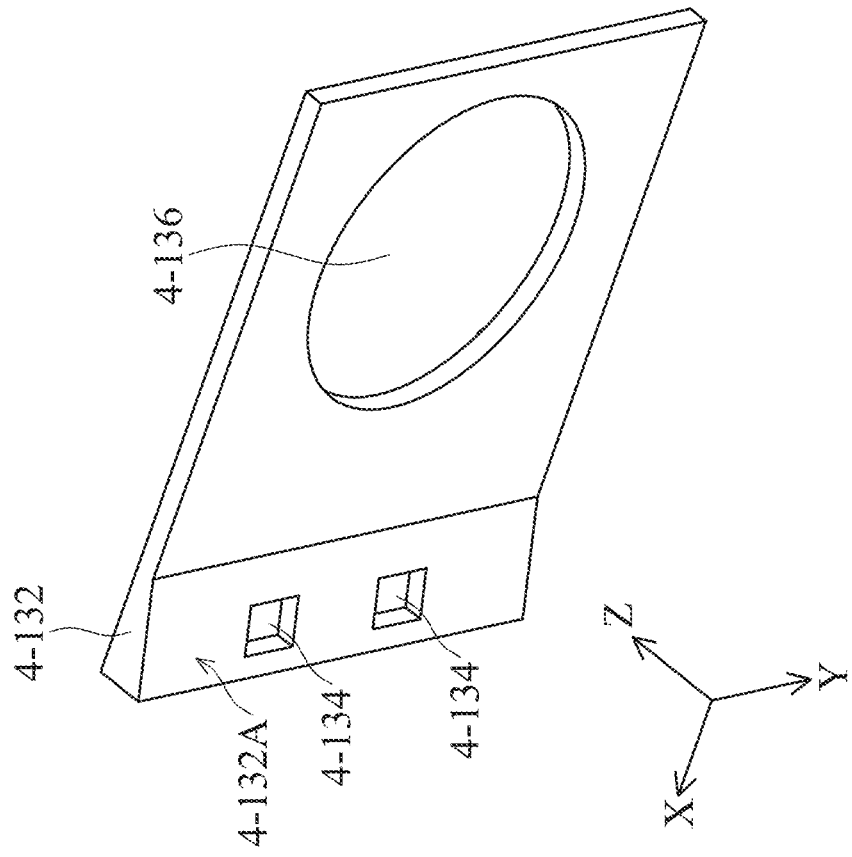
FIG. 9A is a schematic view of the second movable portion.

FIG. 9A is a schematic view of the second movable portion 4-130, and FIG. 9B is a bottom view of the second movable portion 4-130. The lower surface 4-130A of the second movable portion 4-130 has an inclined portion 4-132, and the inclined portion 4-132 has a second sliding surface 4-132A. The second sliding surface 4-132A may have a second recess 4-134. Both the first recess 4-123 and the second recess 4-134 extend in the first direction (X direction).

Figure 10A:
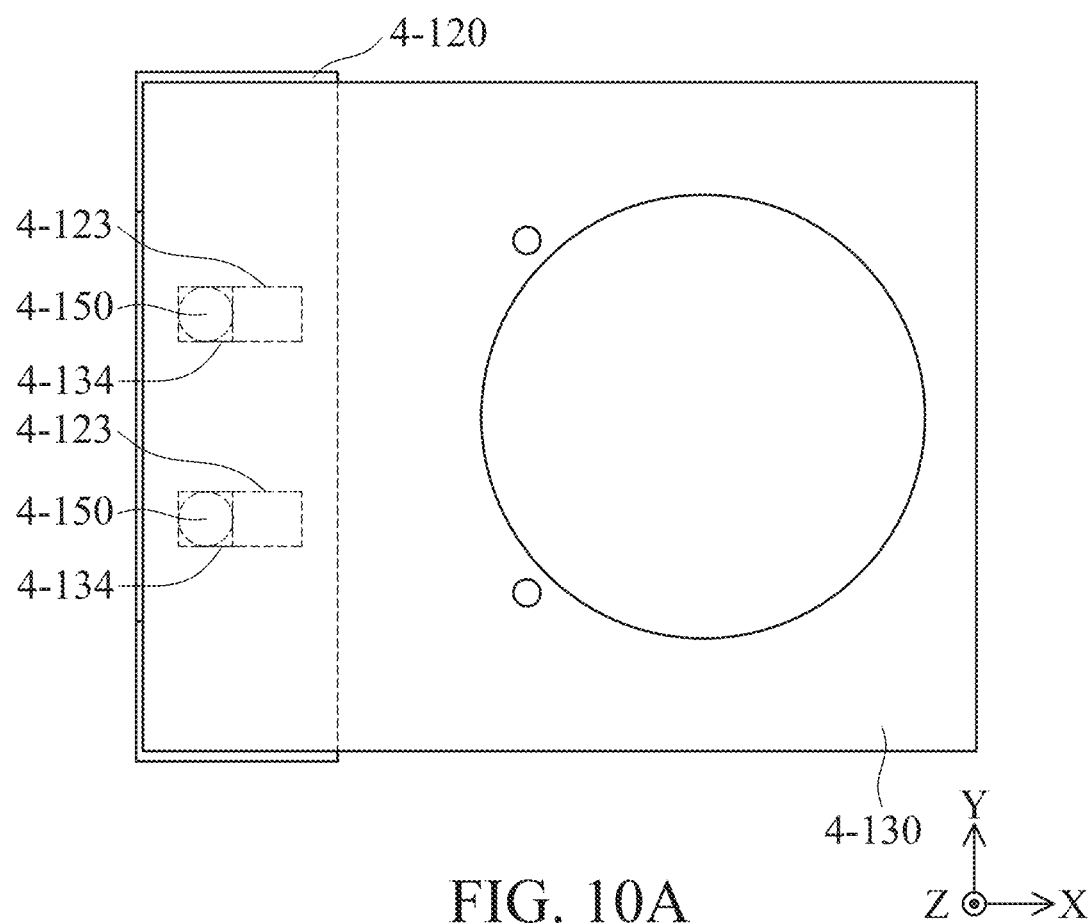
FIG. 10A is a top view of the first movable portion, the second movable portion, and the intermediate element.
Figure 10B:
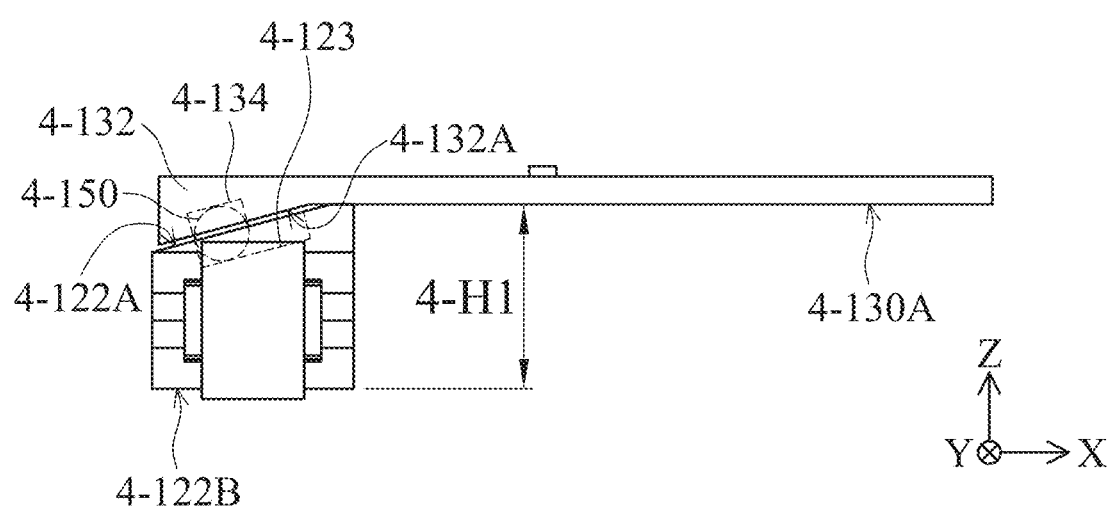
FIG. 10B is a side view of the first movable portion, the second movable portion, and the intermediate element.

An intermediate element 4-150 may be disposed between the first movable portion 4-120 and the second movable portion 4-130, and partially accommodated in the first recess 4-123 and the second recess 4-134. The intermediate element 4-150 may have a spherical shape, and may be movably disposed in the first recess 4-123 and the second recess 4-134 to roll, thereby reducing the frictional force between the first sliding surface 4-122A and the second sliding surface 4-132A to allow the second movable portion 4-130 move relative to the first movable portion 4-120. For example, FIG. 10A is a top view of the first movable portion 4-120, the second movable portion 4-130, and the intermediate element 4-150 in a state, and FIG. 10B is a side view the first movable portion 4-120, the second movable portion 4-130, and the intermediate element 4-150 in this state. At this time, the distance between the bottom surface 4-130A of the second movable portion 4-130 and an extension line of the bottom surface 4-122B of the body 4-122 of the first movable portion 4-120 in the Y direction is the distance 4-H1.

Figure 11A:
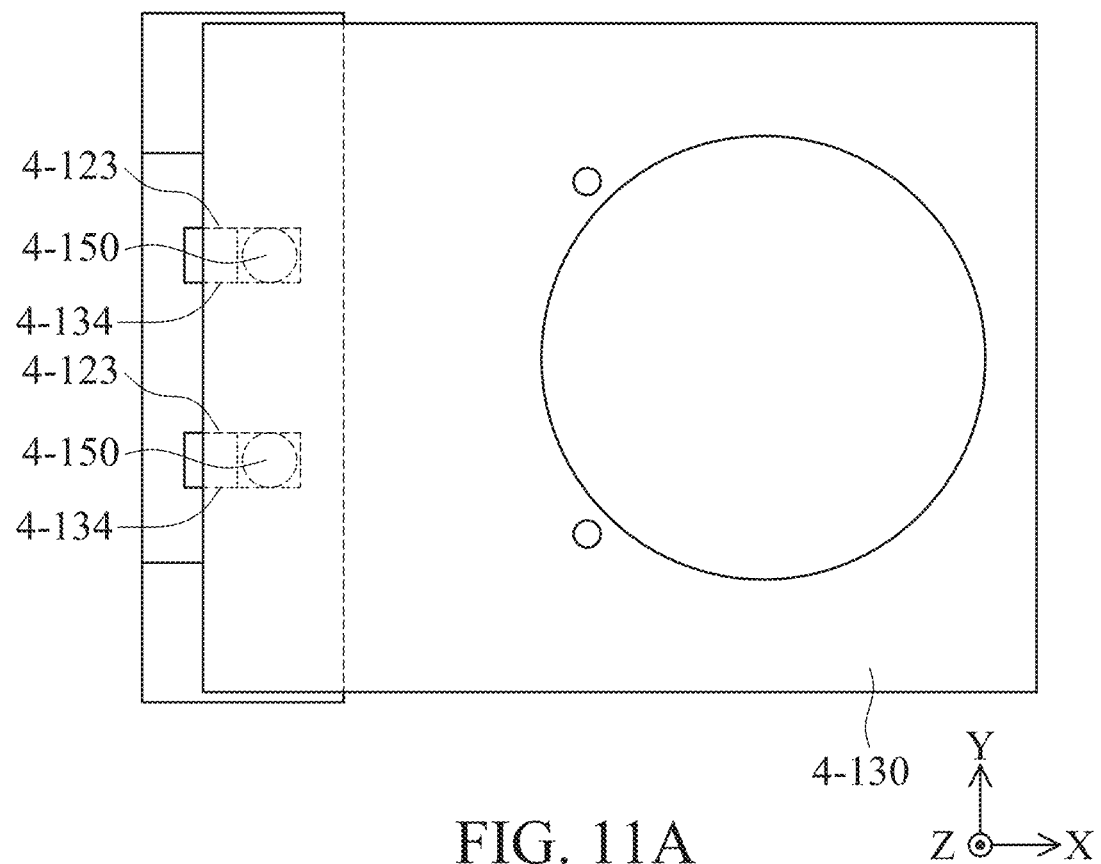
FIG. 11A is a top view of the first movable portion, the second movable portion, and the intermediate element.
Figure 11B:
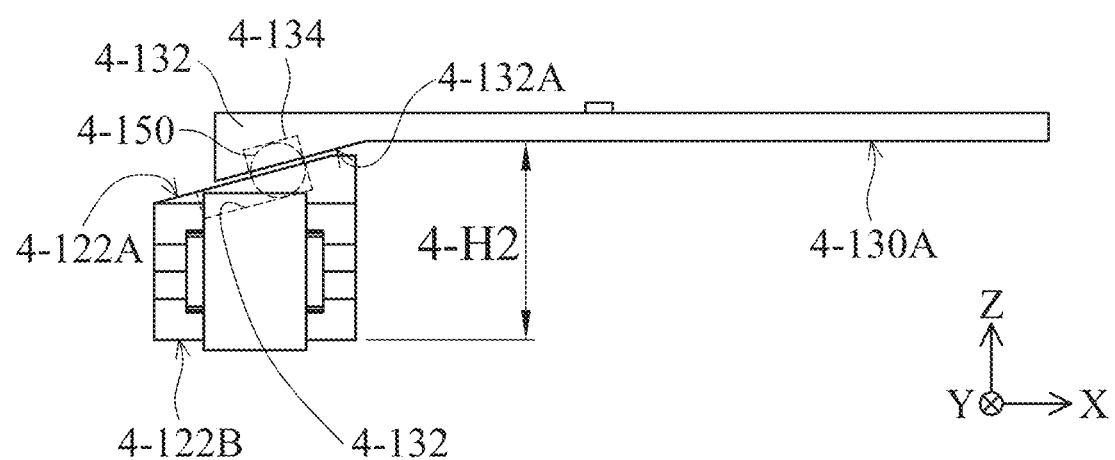
FIG. 11B is a side view of the first movable portion, the second movable portion, and the intermediate element.

Next, FIG. 11A is a top view of the first movable portion 4-120, the second movable portion 4-130, and the intermediate element 4-150 in another state, and FIG. 11B is a side view of the first movable portion 4-120, the second movable portion 4-130, and the intermediate element 4-150 in this state. At this time, the first movable portion 4-120 is driven by the driving assembly 4-140 (not shown) to move in the X direction, and the second movable portion 4-130 is also moved by the first movable portion 4-120 in the Y direction. In this state, the distance between the bottom surface 4-130A of the second movable portion 4-130 and the extension line of the bottom surface 4-122B of the body 4-122 of the first movable portion 4-120 in the Y direction is 4-H2, and the distance 4-H2 is greater than distance 4-H1. Therefore, the second movable portion 4-130 may move in the Z direction.

An optical element (not shown) may be disposed on the second movable portion 4-130 to move the optical element in the Z direction. For example, the optical element may be disposed in the opening 4-136 of the second movable portion 4-130, for example, it may be fixed by means of locking, bonding, or snapping. The aforementioned optical element may be, for example, a lens, a mirror, a prism, a beam splitter, an aperture, a camera module, or a depth sensor, etc. Thereby, the optical element driving mechanism 4-100 may drive the optical element to move in the Z direction, and thus achieving auto focus (AF).

Figure 12A:
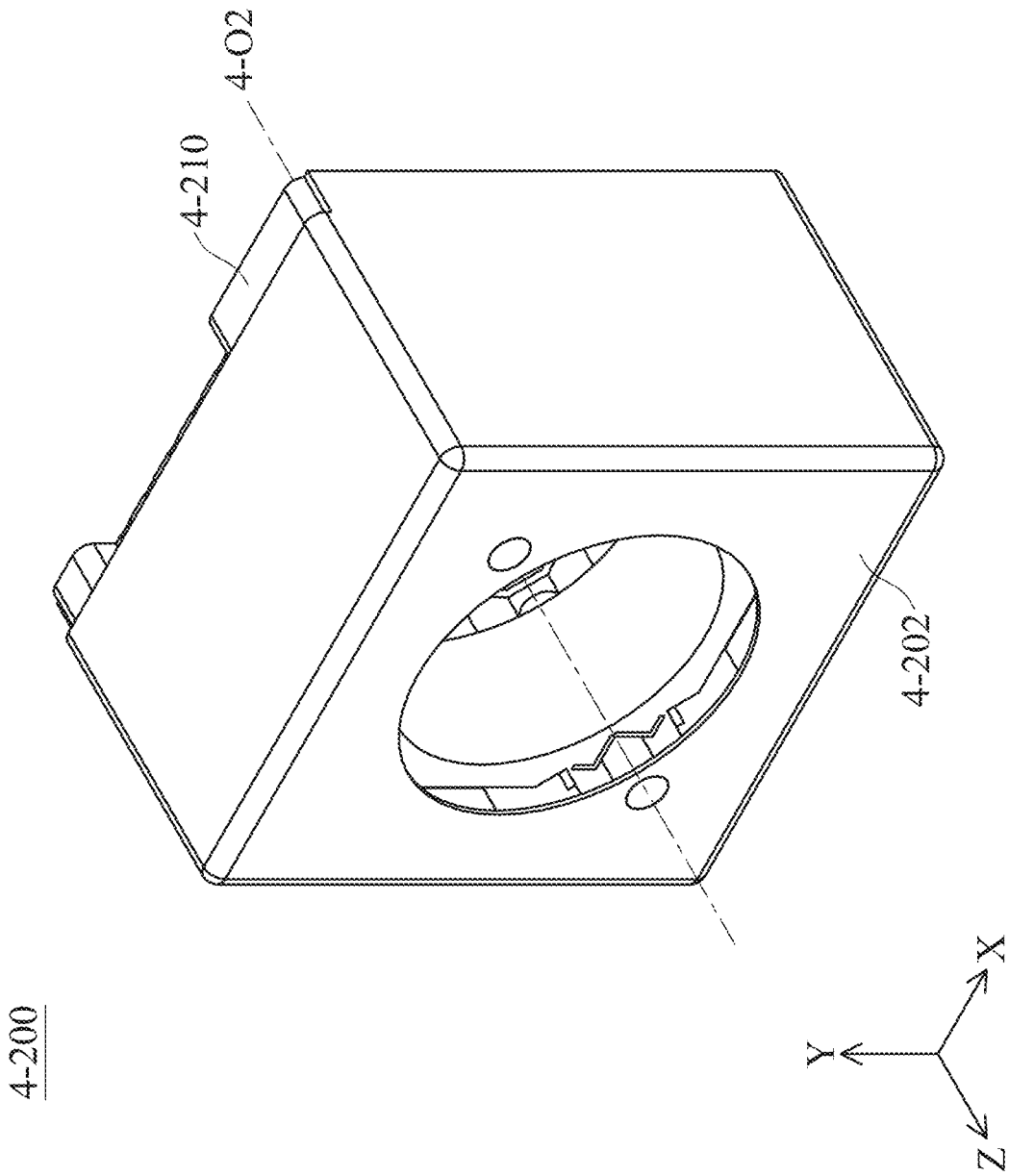
FIG. 12A is a schematic view of the optical element driving mechanism in some embodiments of the present disclosure.
Figure 12B:
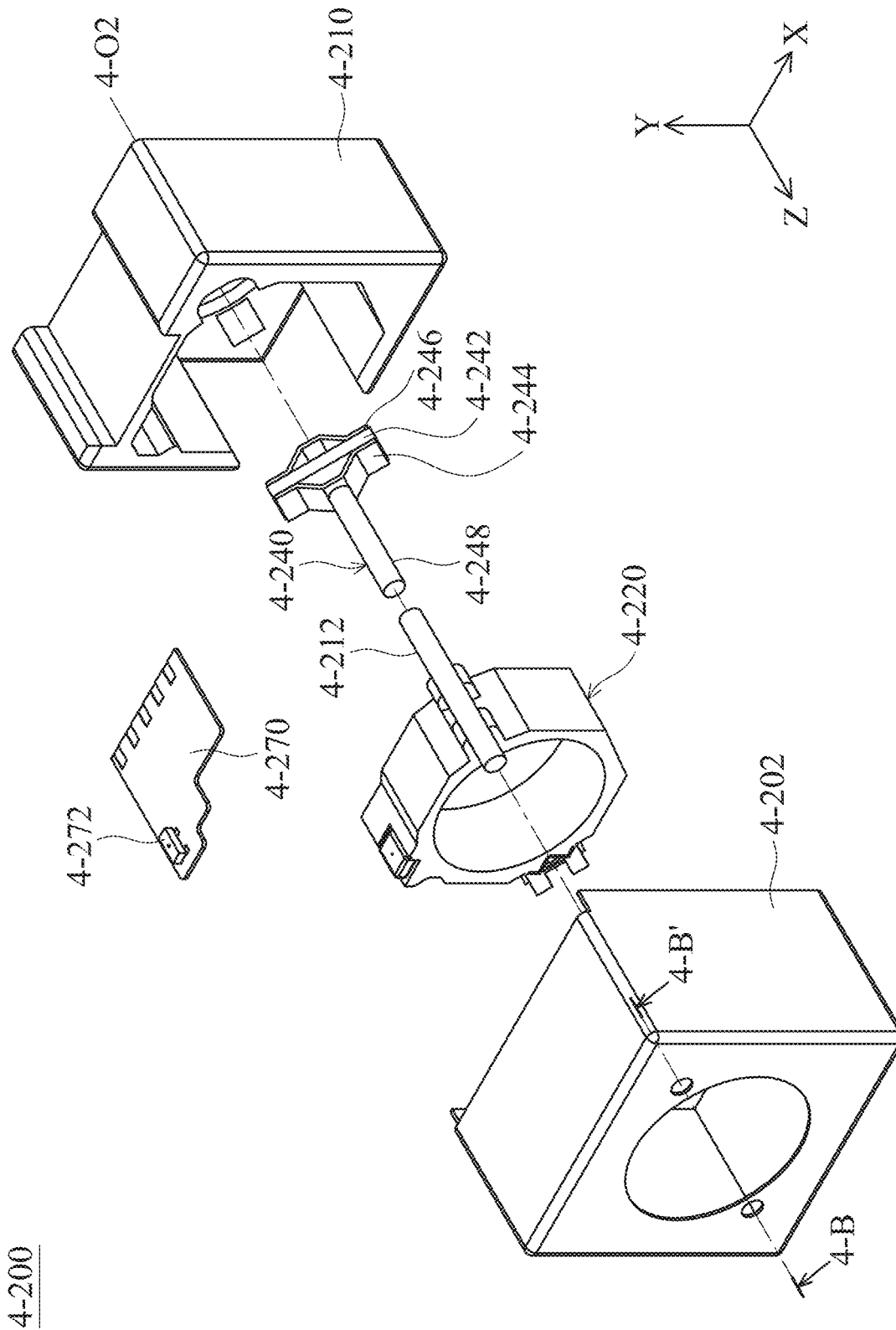
FIG. 12B is an exploded view of the optical element driving mechanism.
Figure 12C:
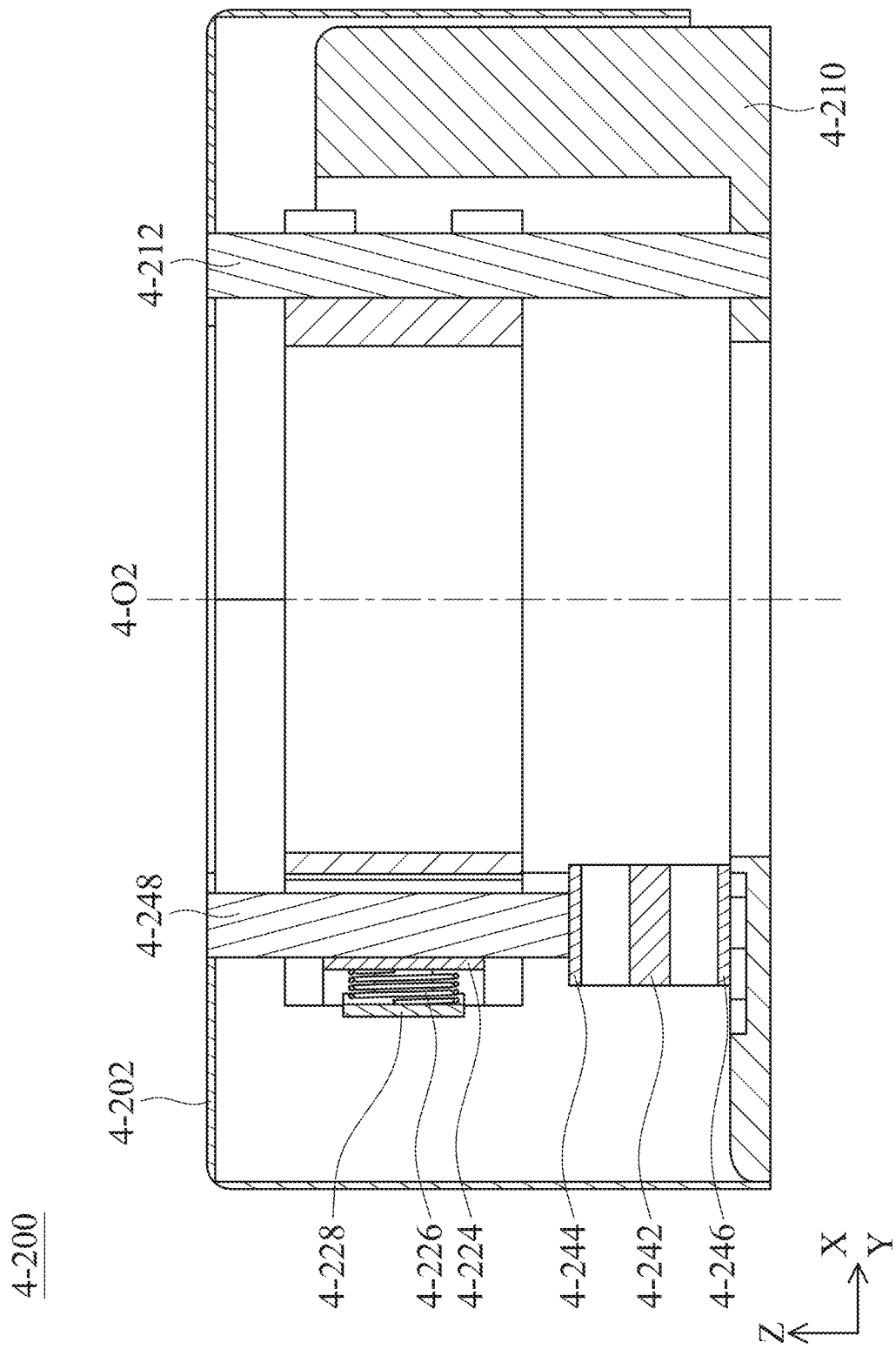
FIG. 12C is a cross-sectional view illustrated along the line 4-B-4-B' in FIG. 12A.

FIG. 12A is a schematic view of an optical element driving mechanism 4-200 in some embodiments of the present disclosure, FIG. 12B is an exploded view of the optical element driving mechanism 4-200, and FIG. 12C is a cross-sectional view of the optical element driving mechanism 4-200 illustrated along the line 4-B-4-B' in FIG. 12A. The optical element driving mechanism 4-200 mainly includes a top case 4-202, a base 4-210, a movable portion 4-220, a driving assembly 4-240, and a circuit board 4-270 arranged along a main axis 4-02.

In some embodiments, the driving assembly 4-240 may include a driving element 4-242, a first resilient element 4-244, a second resilient element 4-246, and a transmission element 4-248. The materials and functions of these elements are similar to that of the driving element 4-42, the first resilient element 4-44, the second resilient element 4-46, and the transmission element 4-48 of the foregoing driving assembly 4-40, which will not be repeated here. In addition, the aforementioned first bonding element 4-43, the second bonding element 4-45, and the third bonding element 4-47 are omitted in the driving assembly 4-240 for simplicity, and it should be understood that the driving assembly 4-240 may also have similar elements.

In some embodiments, the top case 4-202 and the base 4-210 may be combined with each other to form a housing of the optical element driving mechanism 4-200. In addition, the top case 4-202 and the base 4-210 may be referred to as a fixed portion 4-F2. The movable portion 4-220 may be disposed in the space between the top case 4-202 and the base 4-210, and an optical element (not shown) may be disposed on the movable portion 4-220, such as fixed on the movable portion 4-220 by locking, bonding, or snapping. The aforementioned optical element may be, for example, a lens, a mirror, a prism, a beam splitter, an aperture, or may be a camera module or a depth sensor. Thereby, the optical element driving mechanism 4-200 may drive the optical element to move in the Z direction, and thus may achieve auto focus (AF). The driving assembly 4-240 may be affixed to the fixed portion 4-F2, for example, on the base 4-210. In addition, the top case 4-202 and the base 4-210 may have a fixing shaft 4-212 for affixing the relative position between the top case 4-202 and the base 4-210.

Figure 13:
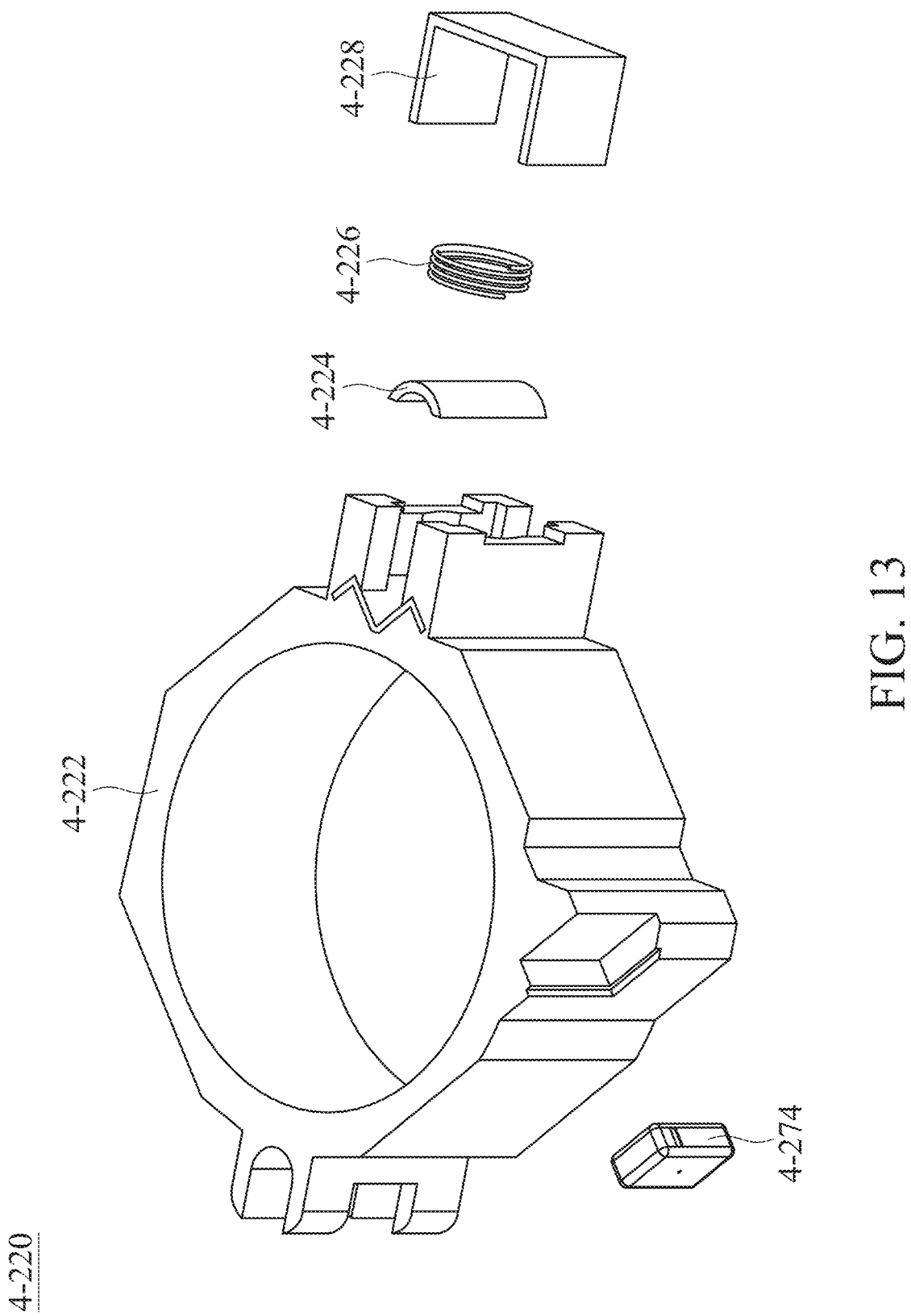
FIG. 13 is an exploded view of the movable portion.
Figure 14:
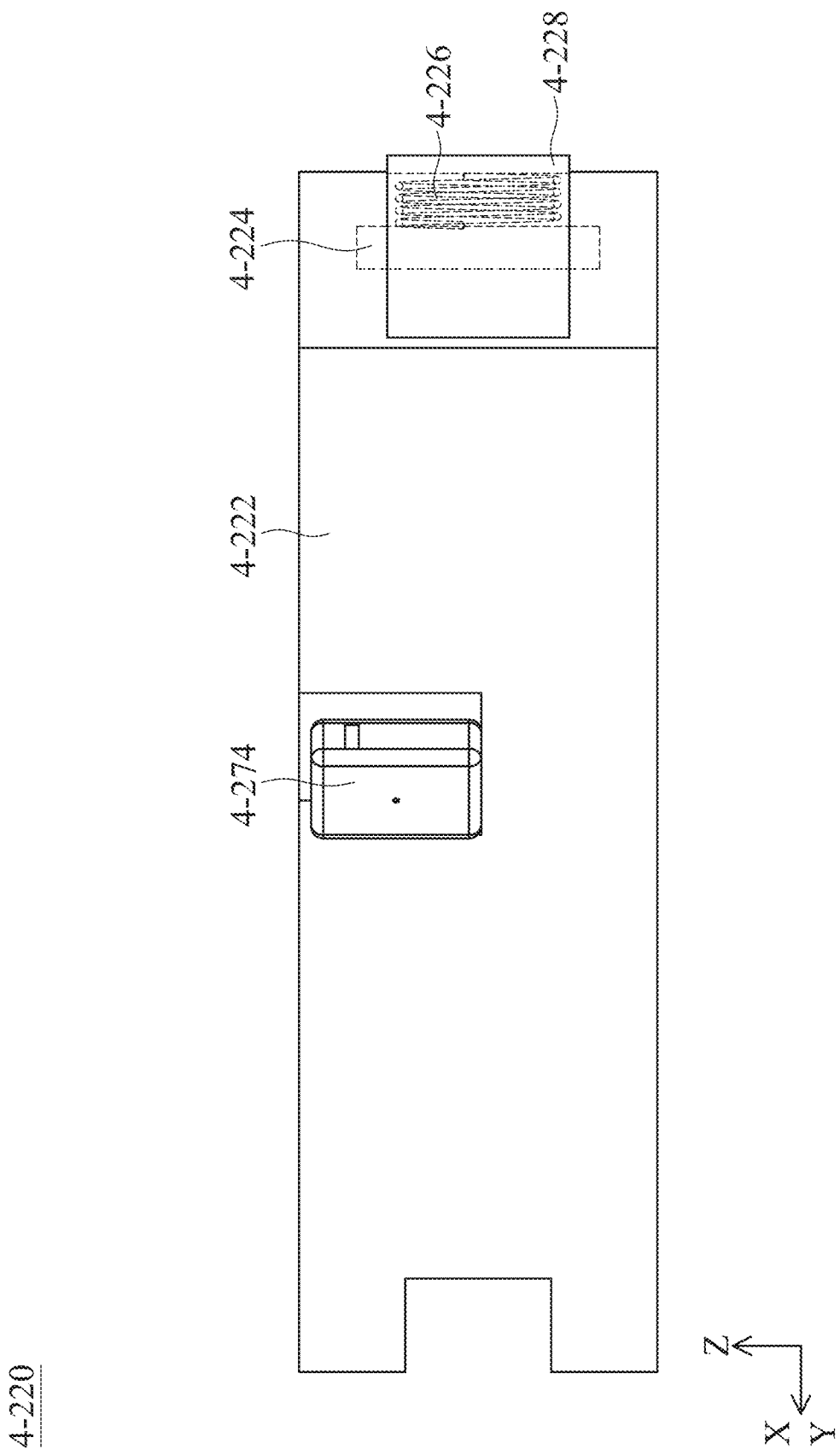
FIG. 14 is a schematic view of the movable portion when viewed in the Y direction.
Figure 15:
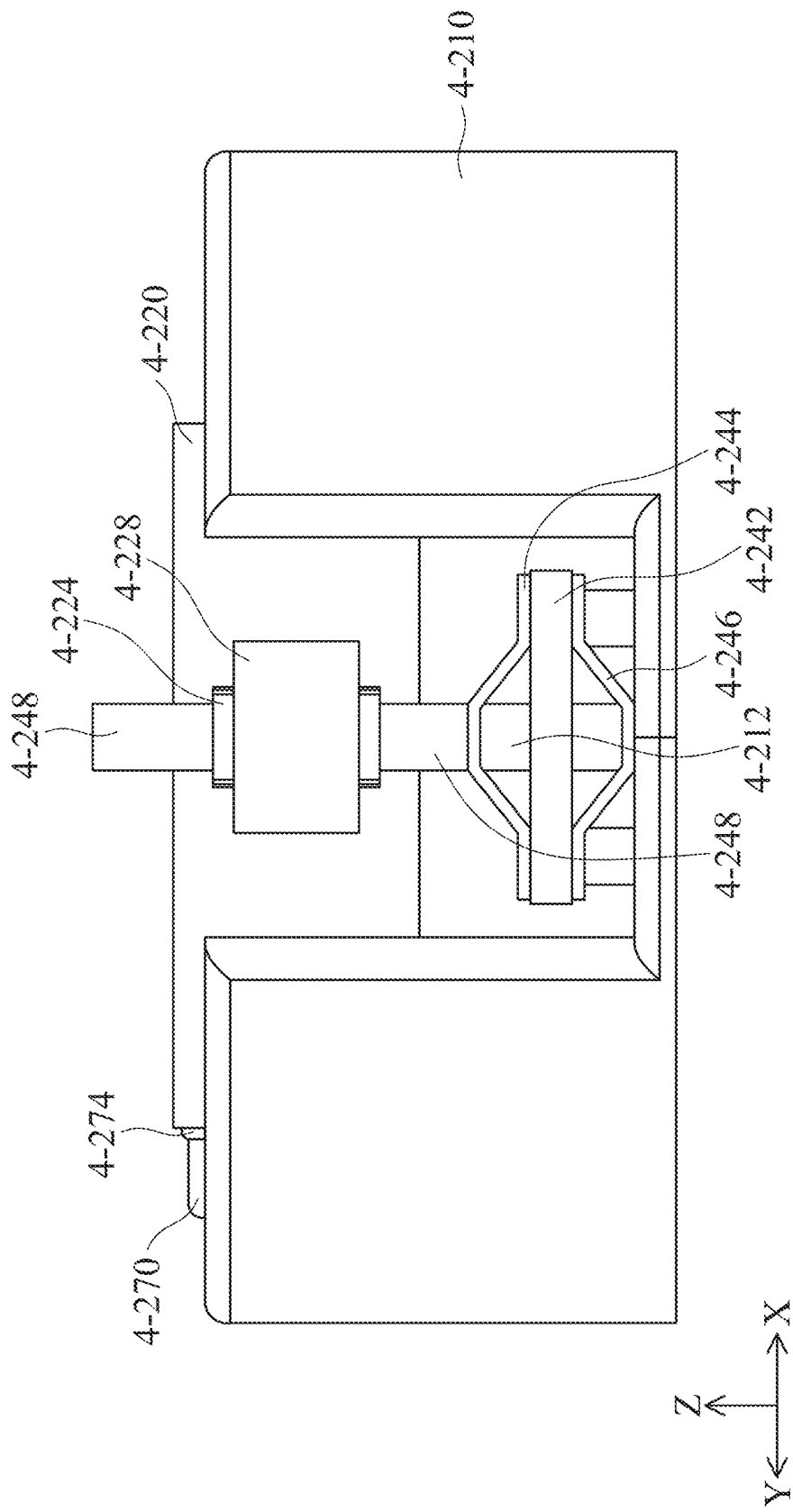
FIG. 15 is a schematic view of the optical element driving mechanism.

FIG. 13 is an exploded view of the movable portion 4-220, and FIG. 14 is a schematic view when the movable portion 4-220 is viewed from the Y direction. FIG. 15 is a schematic view of the optical element driving mechanism 4-200 when viewed from another direction, in which the top case 4-202 is omitted in FIG. 15. The movable portion 4-220 may mainly include a body 4-222, a contact unit 4-224, a pressing element 4-226, and a tightening element 4-228. The transmission element 4-248 may be disposed between the body 4-222 and the contact unit 4-224, and the pressing element 4-226 may be disposed between the contact unit 4-224 and the tightening element 4-228. The tightening element 4-228 may be disposed on the body 4-222.

In some embodiments, the pressing element 4-226 may be, for example, a spring, which may press the transmission element 4-248 through the contact unit 4-224 in a pressing direction, so that the transmission element 4-248 may abut the body 4-222 of the movable portion 4-220. The pressing direction is different from the first direction (for example, Z direction) in which the transmission element 4-248 extends. In addition, the tightening element 4-228 may also be used to pressurize the pressing element 4-226 in the pressing direction. As shown in FIG. 14, when viewed in the Y direction perpendicular to the first direction (for example, the Z direction), the pressing element 4-226 at least partially overlaps the tightening element 4-228. In addition, in the Y direction, the transmission element 4-248, the pressing element 4-226, and the contact unit 4-224 at least partially overlap with each other. Thereby, the size of the movable portion 4-220 in specific directions may be reduced to achieve miniaturization.

By providing the contact unit 4-224, the pressing element 4-226, and the tightening element 4-228 on the movable portion 4-220, the transmission element 4-248 may be forced to abut the body 4-222 of the movable portion 4-220, and the transmission element 4-248 may be disposed on the first movable portion 4-220 in frictional contact. After that, according to the principle of the foregoing embodiment, the movable portion 4-220 may be moved along the extending direction of the transmission element 4-248 (first direction/Z direction).

In addition, the circuit board 4-270 may be affixed to the fixed portion 4-F2, and a sensing element 4-272 may be disposed on the circuit board 4-270, and a sensing magnetic element 4-274 may be disposed on the movable portion 4-220. The sensing element 4-272 may include a Hall sensor, a Magnetoresistance Effect sensor (MR sensor), a Giant Magnetoresistance Effect sensor (GMR sensor), a Tunneling Magnetoresistance Effect sensor (TMR sensor), or a Fluxgate sensor. For example, the sensing magnetic element 4-274 may be a magnet. When the movable portion 4-220 moves relative to the fixed portion 4-F, the sensing element 4-272 may sense the magnetic field change of the sensing magnetic element 4-274 to obtain the portion of the movable portion 4-220 relative to the fixed portion 4-F. Afterwards, a control signal is provided to the driving assembly 4-240 to determine whether the driving assembly 4-240 should keep driving the movable portion 4-220.

Figure 16:
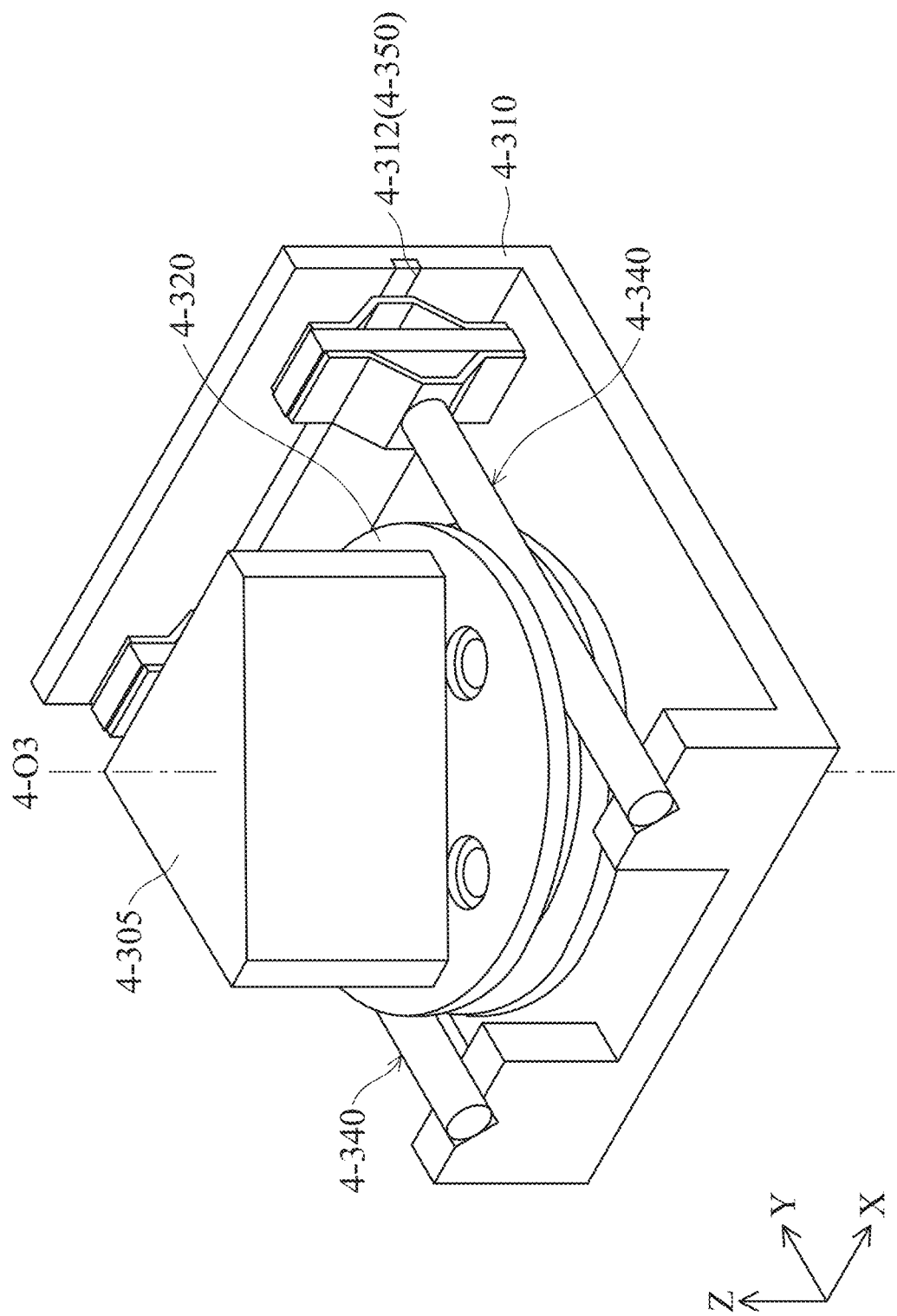
FIG. 16 is a schematic view of the optical element driving mechanism.
Figure 17:
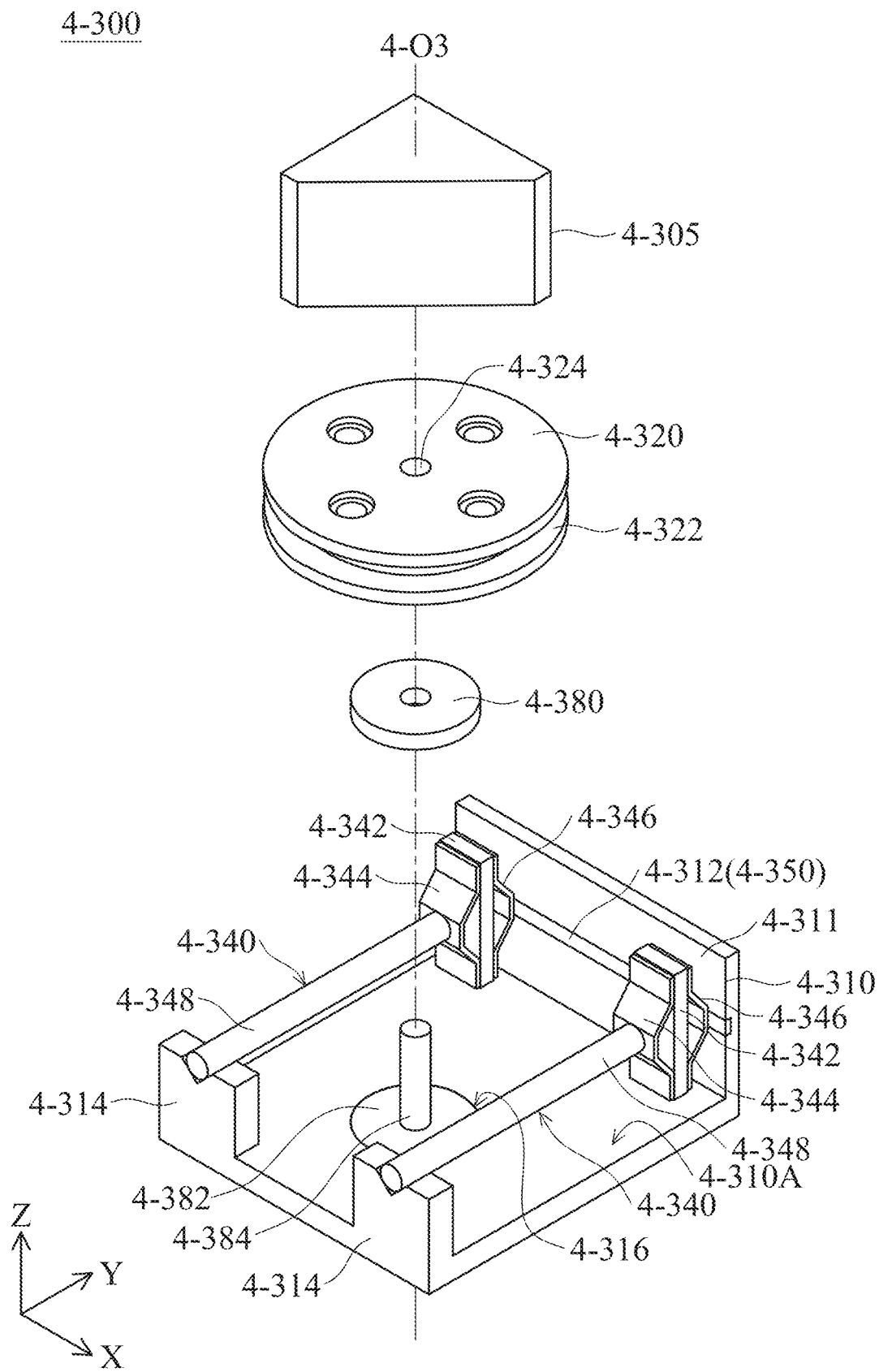
FIG. 17 is an exploded view of the optical element driving mechanism.
Figure 18A:
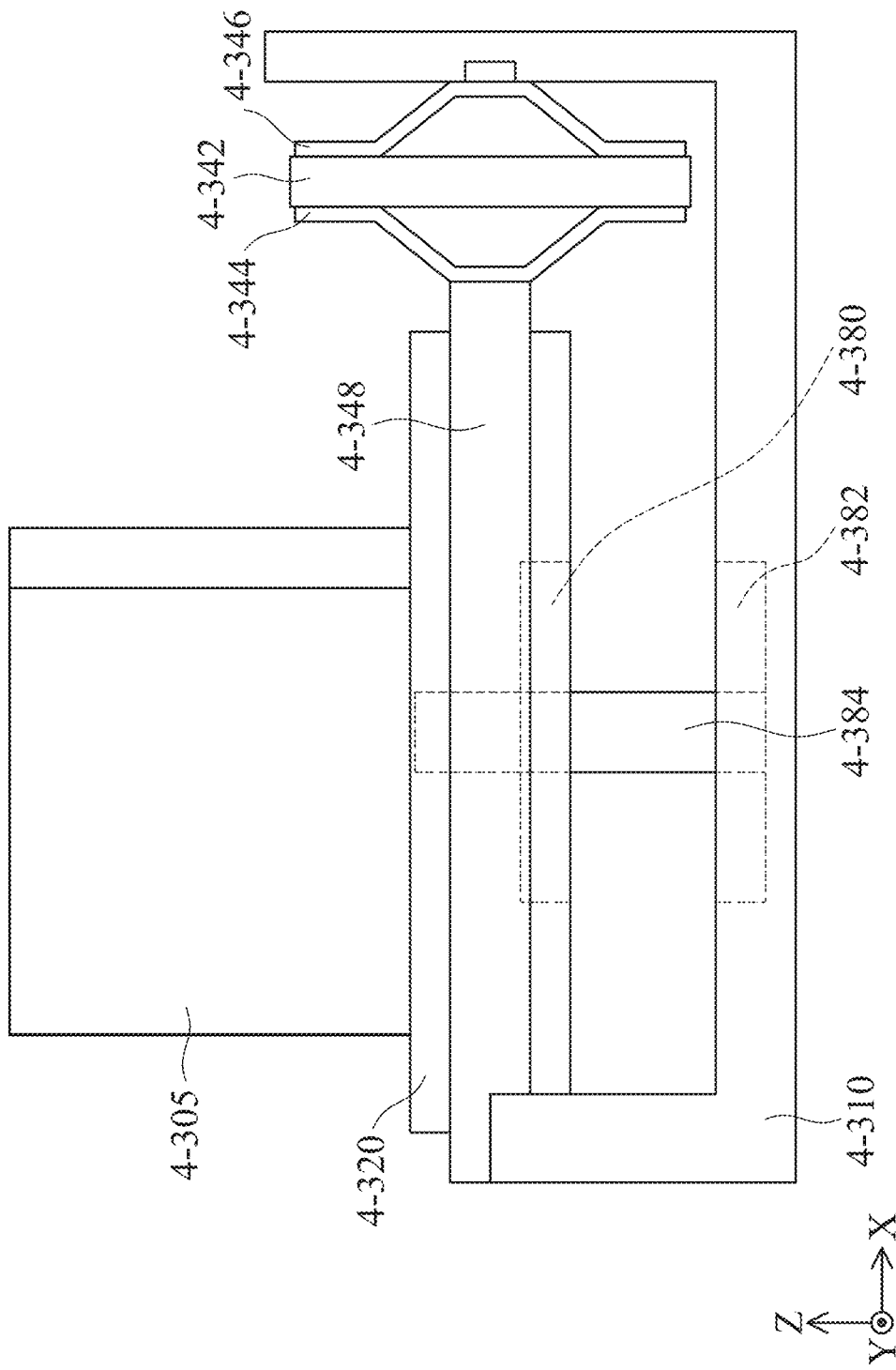
FIG. 18A and FIG. 18B are schematic views of the optical element driving mechanism when viewed in different directions.
Figure 18B:
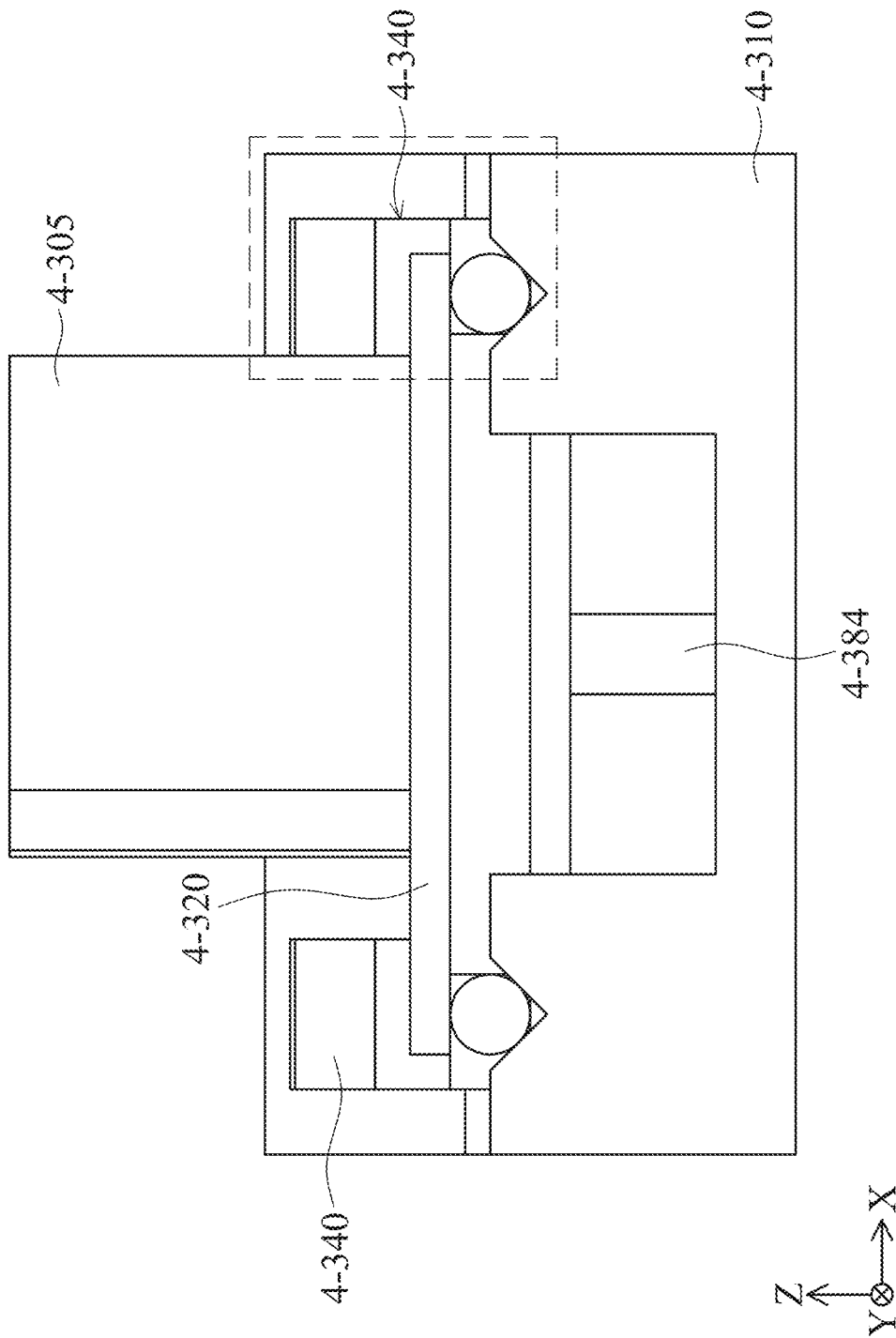
Figure 18C:
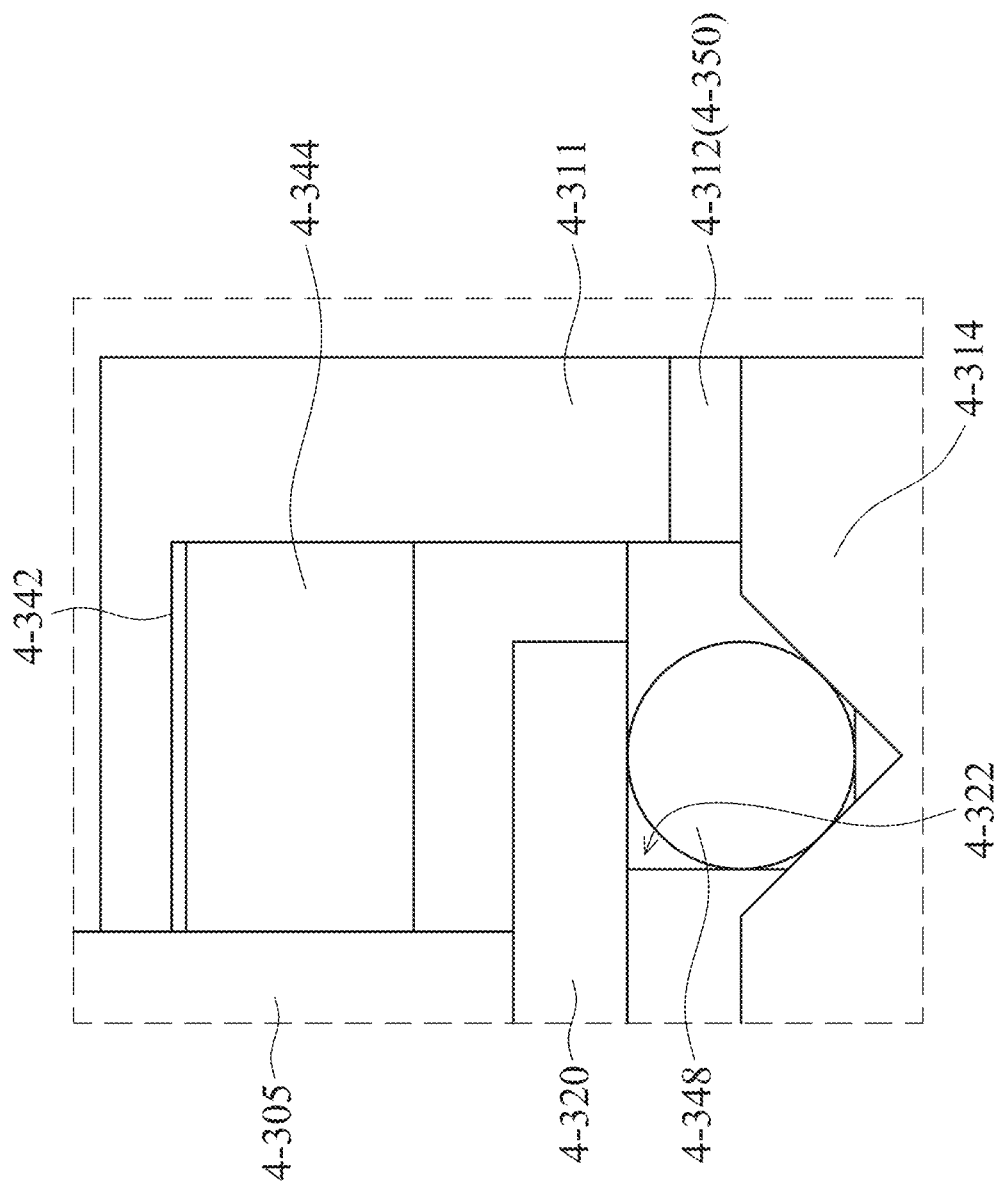
FIG. 18C is an enlarged view of FIG. 18B
Figure 18D:
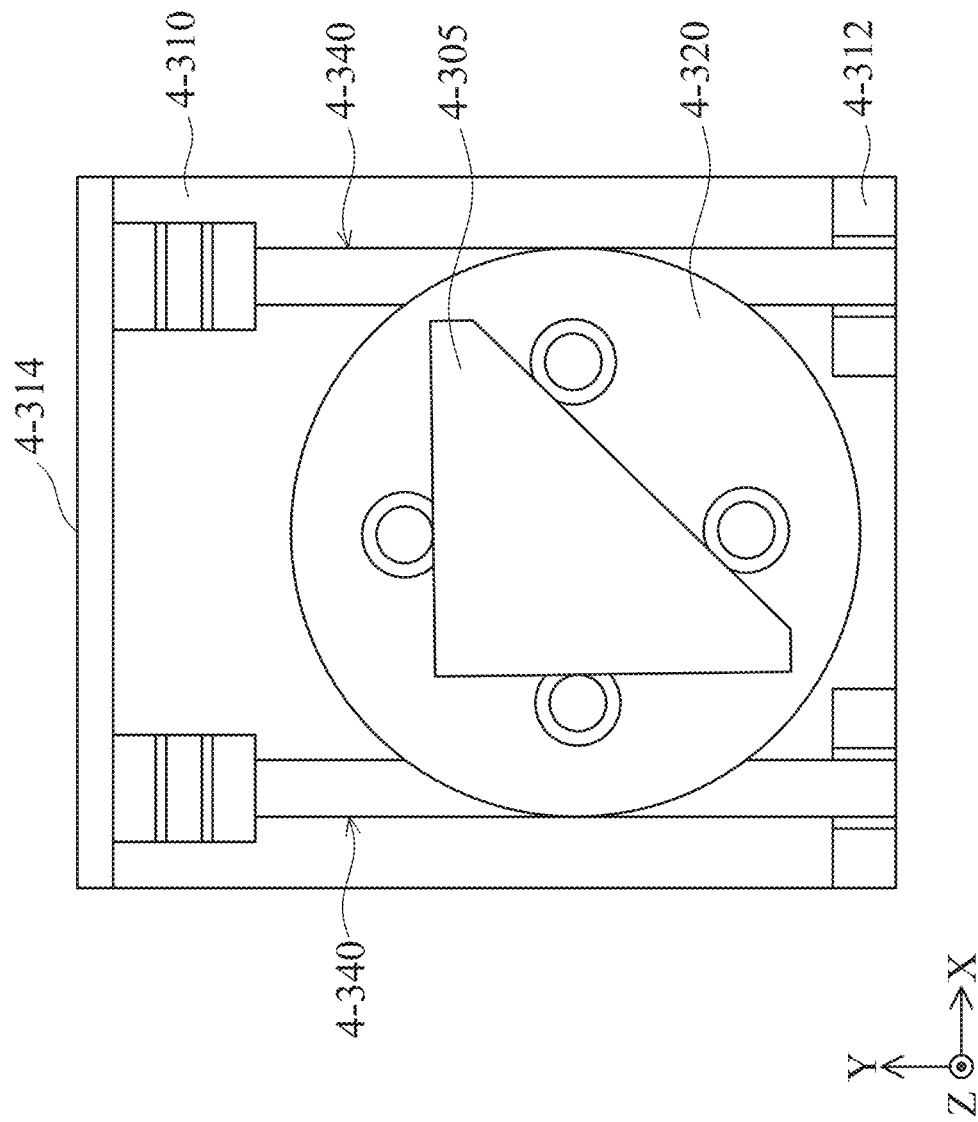
FIG. 18D is a top view of the optical element driving mechanism.

FIG. 16 is a schematic view of an optical element driving mechanism 4-300 in some embodiments of the present disclosure. FIG. 17 is an exploded view of the optical element driving mechanism 4-300. FIG. 18A and FIG. 18B are schematic views of the optical element driving mechanisms 4-300 when viewed from different directions, FIG. 18C is an enlarged view of FIG. 18B, and FIG. 18D is a top view of the optical element driving mechanism 4-300. The optical element driving mechanism 4-300 may be used to hold an optical element 4-305, and mainly includes a fixed portion 4-310, a movable portion 4-320, a driving assembly 4-340, a first magnetic element 4-380, a second magnetic element 4-382, and shaft 4-384. The optical element 4-305 may be, for example, a lens, a reflector, a prism, a beam splitter, an aperture, a camera module, or a depth sensor. The optical element driving mechanism 4-300 may drive the optical element 4-305 to rotate relative to the shaft 4-384.

In some embodiments, the driving assembly 4-340 may include a driving element 4-342, a first resilient element 4-344, a second resilient element 4-346, and a transmission element 4-348, the materials and functions of which are similar to the driving element 4-42, the first resilient element 4-44, the second resilient element 4-46, and the transmission element 4-48 of the driving assembly 4-40, respectively, which will not be repeated here. In addition, the first bonding element 4-43, the second bonding element 4-45, and the third bonding element 4-47 are omitted in the driving assembly 4-340 for simplicity, but it should be understood that the driving assembly 4-340 may also include similar elements.

The driving assembly 4-340 may be affixed to the fixed portion 4-310. Specifically, the fixed portion 4-310 may include a sidewall 4-311, the sidewall 4-311 may have a concave portion 4-312, and a bonding element 4-350 may be disposed in the concave portion 4-312 to fix the relative position between the driving assembly 4-340 and the fixed portion 4-310. In addition, the fixed portion 4-310 may further have a supporting portion 4-314, and an end of the transmission element 4-348 which is away from the sidewall 4-311 may be disposed on the supporting portion 4-314 to support the driving assembly 4-340. In this embodiment, the optical element driving mechanism 4-300 includes two driving assemblies 4-340, and the two driving assemblies 4-340 are both affixed to the fixed portion 4-310 by the bonding element 4-350 disposed in the same concave portion 4-312.

In addition, the fixed portion 4-310 may also include a concave part 4-316, and the first magnetic element 4-380 may be disposed in the concave part 4-316, so that the first magnetic element 4-380 may be affixed to the fixed portion 4-310. The second magnetic element 4-382 may be disposed on the movable portion 4-320, and is designed to be aligned with the first magnetic element 4-380 in the Z direction, so that the first magnetic element 4-380 and the second magnetic element 4-382 are attracted with each other. Thereby, a magnetic force may be generated between the first magnetic element 4-380 and the second magnetic element 4-382, so that the force may be applied to the movable portion 4-320, wherein the direction of the force is from the movable portion 4-320 to the fixed portion 4-310.

In some embodiments, a dustproof glue (not shown) may be provided on the surface 4-310A of the fixed portion 4-310, so as to collect debris that may be generated during the operation of the optical element driving mechanism 4-300, so the performance of the optical component drive mechanism 4-300 may be prevented from being influenced by the debris.

The movable portion 4-320 may have, for example, a circular shape, and a recess 4-322 may be formed on the outer surface of the movable portion 4-320 at the circumference, and the transmission element 4-348 of the driving assembly 4-340 may be disposed in the recess 4-322. Thereby, the transmission element 4-348 may be disposed on the movable portion 4-320 in a frictional contact. In addition, the circular movable portion 4-320 may have an opening 4-324 at the center. A rotating shaft 4-384 may extend in the direction of the main axis 4-03 and may pass through the first magnetic element 4-380, the second magnetic element 4-382, and the opening 4-324 to allow the movable portion 4-320 to rotate relative to the rotating shaft 4-384. Afterwards, according to the principle of the foregoing embodiment, the driving element 4-340 drives the movable portion 4-320 to rotate.

It should be noted that as shown in FIG. 18A and FIG. 18B, the transmission element 4-348 is exposed from the recess 4-322. In addition, the optical element driving mechanism 4-300 is illustrated as including two driving assemblies 4-340, and the transmission elements 4-348 of the two driving assemblies 4-340 may move in opposite directions. For example, if one of the transmission elements 4-348 moves in the Y direction, then the other transmission element 4-348 may move in the −Y direction to apply a torque to the movable portion 4-320 in the same direction and achieve a higher driving force. However, the present disclosure is not limited thereto. For example, it is possible to provide only one driving element 4-340 to achieve similar effects, and miniaturization may also be achieved.

In some embodiments, as shown in FIG. 18A, the rotation shaft 4-384 at least partially overlaps the movable portion 4-320 and the transmission element 4-348, and the first magnetic element 4-380, the second magnetic element 4-382, and the rotating shaft 4-384 also at least partially overlap each other when viewed in the Y direction. Thereby, the size of the optical element driving mechanism 4-300 in a specific direction may be reduced, and miniaturization may be achieved. In some embodiments, as shown in FIG. 18C, the driving element 4-342 is exposed from the first resilient element 4-344 when viewed in the Y direction.

It should be noted that since the first magnetic element 4-380 and the second magnetic element 4-382 apply a force on the movable portion 4-320 in a direction toward the fixed portion 4-310, the movable portion 4-320 may be prevented from falling out from the optical element driving mechanism 4-300 during operation. In addition, the position of the movable portion 4-320 in the Z direction may be limited by disposing the transmission element 4-348 in the recess 4-322 of the movable portion 4-320.

Figure 19:
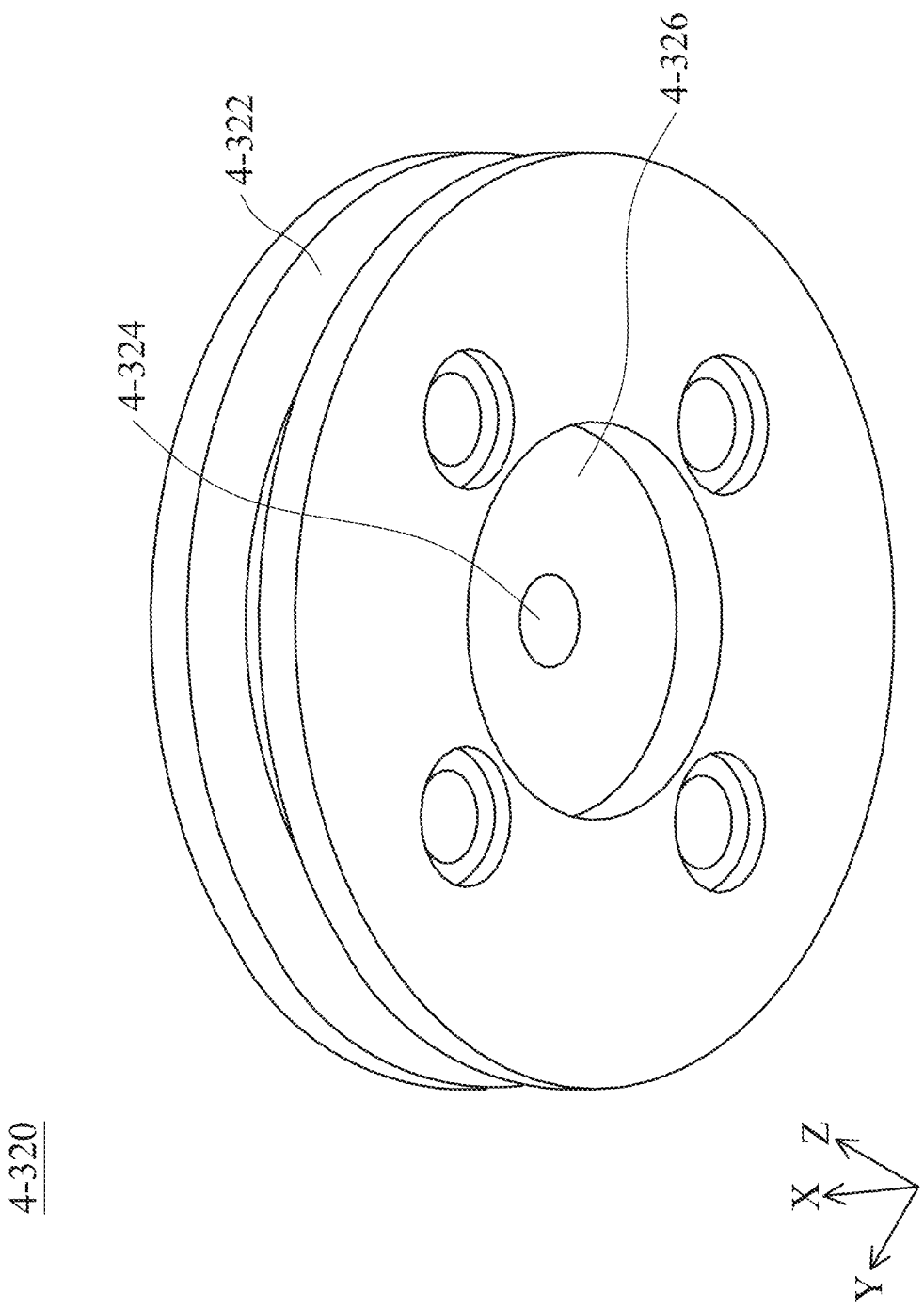
FIG. 19 is a schematic view of the movable portion.

FIG. 19 is a schematic view of the movable portion 4-320. The movable portion 4-320 may have a recessed structure 4-326 on the surface facing the fixed portion 4-310 for accommodating the second magnetic element 4-382.

Figure 20:
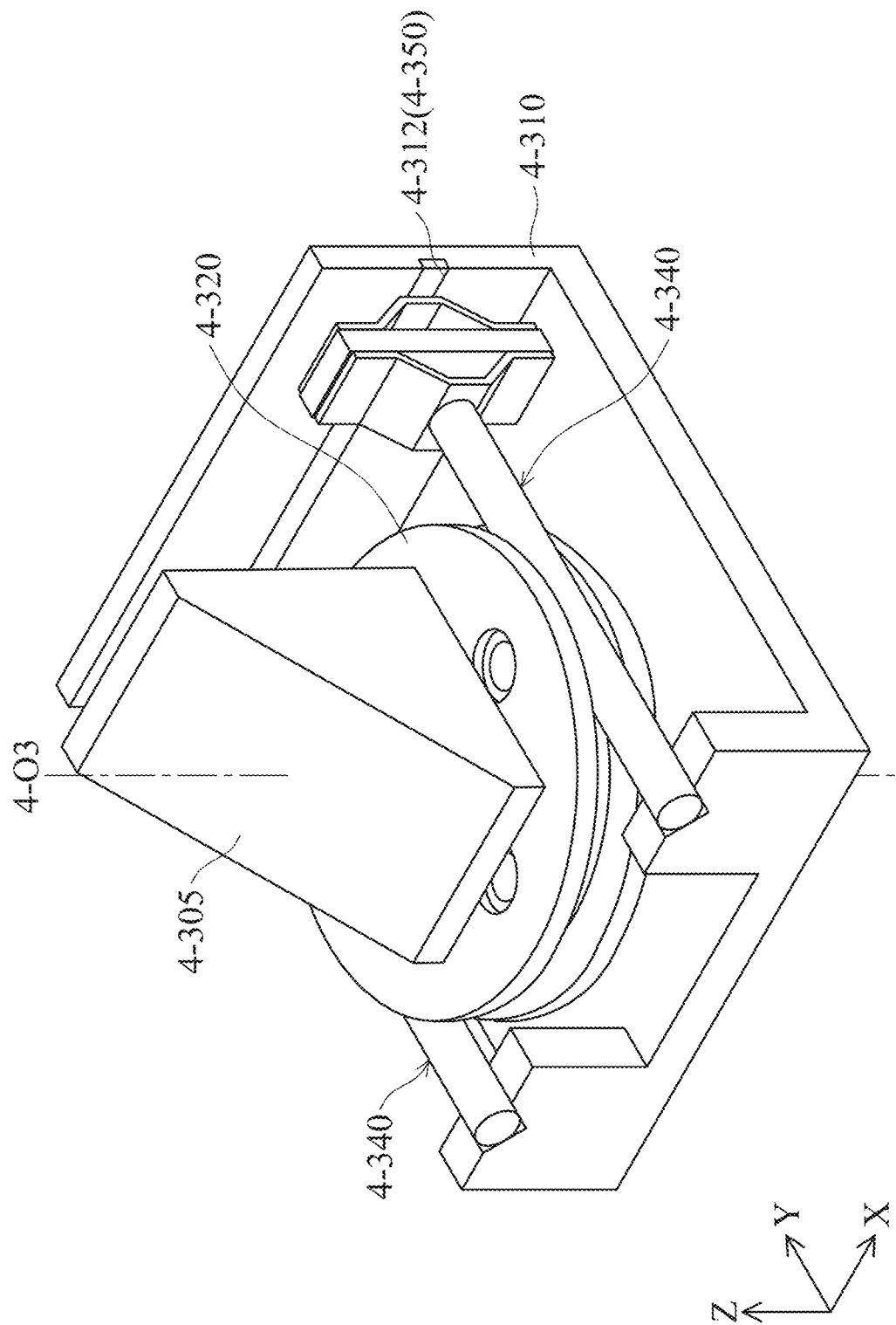
FIG. 20 is a schematic view of the optical element driving mechanism.

FIG. 20 is another design of the optical element driving mechanism. The optical element 4-305 may be disposed on the movable portion 4-320 in a manner different from that of FIG. 16, so that light from other directions may be processed.

In summary, an optical element driving mechanism is provided. The optical element driving mechanism includes a fixed portion, a movable portion, and a driving assembly. The fixed portion includes a main axis. The movable portion is movable relative to the fixed portion and is connected to an optical element. The driving assembly is used to drive the movable portion to move relative to the fixed portion. As a result, the optical element may move in desired directions to achieve desired functions.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising: a fixed portion having a main axis; a movable portion movably disposed on the fixed portion and connected to an optical element; a driving assembly driving the movable portion to move relative to the fixed portion; wherein the driving assembly comprises a transmission element, a first resilient element, a second resilient element, and a driving element; wherein the driving element is connected to the transmission element through the first resilient element, and the transmission element is driven by the driving element to move in a first direction; and a pressing element pressing the transmission in a pressing direction, wherein the transmission element abuts the movable portion, and the pressing direction is different than the first direction; a tightening element pressing the pressing element, wherein the pressing element at least partially overlaps the tightening element when viewed in a direction that is perpendicular to the first direction; and a contact unit disposed between the pressing element and the transmission element, wherein the transmission element, the pressing element, and the contact unit at least partially overlap each other.

2. The optical element driving mechanism as claimed in claim 1, wherein the driving element drives the transmission element to move in the first direction when the driving element is deformed in a second direction, and the first direction and the second direction are not parallel.

3. The optical element driving mechanism as claimed in claim 2, wherein when the driving element is deformed in the second direction, the size of the first resilient element in the first direction is changed to move the transmission element in the first direction.

4. The optical element driving mechanism as claimed in claim 1, wherein the driving element comprises two piezoelectric units arranged in the second direction.

5. The optical element driving mechanism as claimed in claim 4, wherein the driving element further comprises an adhering element disposed between the piezoelectric units, and the piezoelectric units are electrically connected to each other in parallel or in series.

6. The optical element driving mechanism as claimed in claim 1, wherein the driving assembly further comprises a second resilient element, the first resilient element and the second resilient element are disposed on different sides of the driving element, the second resilient element is connected to the fixed portion, when the driving element is deformed in the second direction, the size of the second resilient element in the first direction is changed to move the driving element and the transmission element in the first direction, and the deformation amount of the first resilient element and the deformation amount of the second resilient element are substantially identical.

7. The optical element driving mechanism as claimed in claim 1, further comprising a rotational shaft disposed on the fixed portion, and the transmission element drives the movable portion to rotate relative to the rotational shaft.

8. The optical element driving mechanism as claimed in claim 7, wherein the movable portion comprises a recess surrounding the rotational shaft and positioned at an outer surface of the movable portion, the transmission element is disposed in the recess, and the transmission element is exposed from the recess when viewed in a direction that is perpendicular to the main axis.

9. The optical element driving mechanism as claimed in claim 7, wherein the rotational shaft at least partially overlaps the movable portion when viewed in a direction that is perpendicular to the second direction, and the rotational shaft at least partially overlaps the transmission element when viewed in a third direction that is perpendicular to the first direction and the second direction.

10. The optical element driving mechanism as claimed in claim 1, wherein the driving element is exposed from the first resilient element when viewed in the first direction.

11. The optical element driving mechanism as claimed in claim 1, wherein the movable portion comprises:
a first movable portion movably connected to the fixed portion; and
a second movable portion movably connected to the first movable portion and connected to the optical element.

12. The optical element driving mechanism as claimed in claim 11, wherein the driving assembly comprises a transmission element, a first resilient element, and a driving element, and the driving element drives the transmission element through the first resilient element to move in a first direction.

13. The optical element driving mechanism as claimed in claim 12, wherein the first movable portion moves in the first direction, the second movable portion moves in a second direction that is different than the first direction, and the transmission element is movably connected to the first movable portion.

14. An optical element driving mechanism, comprising: a fixed portion having a main axis; a movable portion movably disposed on the fixed portion and connected to an optical element; a driving assembly driving the movable portion to move relative to the fixed portion; wherein the driving assembly comprises a transmission element, a first resilient element, a second resilient element, and a driving element; wherein the driving element is connected to the transmission element through the first resilient element, and the transmission element is driven by the driving element to move in a first direction; a rotational shaft disposed on the fixed portion, and the transmission element drives the movable portion to rotate relative to the rotational shaft; a first magnetic element disposed on the movable portion; and a second magnetic element disposed on the fixed portion, wherein the first magnetic element, the second magnetic element, and the rotational shaft at least partially overlap each other when viewed in a direction that is perpendicular to a second direction, and a force exerted toward the fixed portion is applied to the movable portion by the first magnetic element and the second magnetic element, wherein the fixed portion comprises a concave part, the movable portion comprises a recessed structure, the first magnetic element is disposed in the concave part, and the second magnetic element is disposed in the recessed structure.

15. An optical element driving mechanism, comprising: a fixed portion having a main axis; a movable portion movably disposed on the fixed portion and connected to an optical element; a driving assembly driving the movable portion to move relative to the fixed portion; wherein the driving assembly comprises a transmission element, a first resilient element, a second resilient element, and a driving element; wherein the driving element is connected to the transmission element through the first resilient element, and the transmission element is driven by the driving element to move in a first direction; a rotational shaft disposed on the fixed portion, and the transmission element drives the movable portion to rotate relative to the rotational shaft; and a bonding element, wherein the fixed portion comprises a concave portion, the first resilient element is positioned between the fixed portion and the piezoelectric units, the bonding element is disposed in the concave portion, and the first resilient element is connected to the fixed portion via the bonding element.

16. The optical element driving mechanism as claimed in claim 15, further comprising another driving assembly, and the driving assemblies are connected to the fixed portion via the bonding element.

17. An optical element driving mechanism, comprising: a fixed portion having a main axis; a movable portion movably disposed on the fixed portion and connected to an optical element; a driving assembly driving the movable portion to move relative to the fixed portion; wherein the movable portion comprises: a first movable portion movably connected to the fixed portion; and a second movable portion movably connected to the first movable portion and connected to the optical element; wherein the driving assembly comprises a transmission element, a first resilient element, and a driving element, and the driving element drives the transmission element through the first resilient element to move in a first direction; wherein the first movable portion moves in the first direction, the second movable portion moves in a second direction that is different than the first direction, and the transmission element is movably connected to the first movable portion; and an intermediate element and a bonding element, wherein the intermediate element is positioned between the first movable portion and the second movable portion, the first movable portion comprises a first sliding surface and the second movable portion comprises a second sliding surface, wherein the first sliding surface faces the second sliding surface, and the first sliding surface and the second sliding surface are neither perpendicular nor parallel to the first direction or the second direction, wherein the intermediate element is disposed between the first sliding surface and the second sliding surface; a first recess is positioned on the first sliding surface extending in the first direction when viewed in the second direction, and the intermediate element is disposed in the first recess, a second recess is positioned on the second sliding surface extending in the first direction when viewed in the second direction, and the intermediate element is disposed in the second recess, the driving assembly is connected to the fixed portion via the bonding element, the fixed portion further comprises a base, and the driving assembly is connected to the base via the bonding element, the base comprises a first connecting surface that is parallel to the second direction, the driving assembly comprises a second connecting surface that is opposite the first connecting element, and the bonding element is disposed between the first connecting surface and the second connecting surface, the first connecting surface at least partially overlaps the transmission element when viewed in the first direction.

18. The optical element driving mechanism as claimed in claim 17, further comprising a third resilient element movably connected to the second movable portion and the fixed portion, and the second movable portion is positioned between the third resilient element and the transmission element.

* * * * *